United States Patent
Sugar et al.

(10) Patent No.: US 7,317,419 B2
(45) Date of Patent: Jan. 8, 2008

(54) SELF-CALIBRATED PATH LOSS POSITION ESTIMATION AND ZONE OF IMPACT DETERMINATION

(75) Inventors: Gary L. Sugar, Rockville, MD (US); Yohannes Tesfai, Silver Spring, MD (US)

(73) Assignee: Cognio, Inc., Germantown, MD (US)

( * ) Notice: Subject to any disclaimer, the term of this patent is extended or adjusted under 35 U.S.C. 154(b) by 246 days.

(21) Appl. No.: 11/156,463

(22) Filed: Jun. 21, 2005

(65) Prior Publication Data

US 2005/0285793 A1    Dec. 29, 2005

Related U.S. Application Data

(63) Continuation-in-part of application No. 10/976,509, filed on Oct. 29, 2004, now Pat. No. 7,236,128.

(60) Provisional application No. 60/684,966, filed on May 27, 2005, provisional application No. 60/648,993, filed on Jan. 31, 2005, provisional application No. 60/582,317, filed on Jun. 23, 2004.

(51) Int. Cl.
  *G01S 3/02* (2006.01)
(52) U.S. Cl. ................ 342/464; 342/452; 455/115.3
(58) Field of Classification Search ............... 342/174, 342/463–465, 452; 455/115.3
  See application file for complete search history.

(56) References Cited

U.S. PATENT DOCUMENTS

| | | | |
|---|---|---|---|
| 4,054,785 A | 10/1977 | Lehmann | |
| 4,227,255 A | 10/1980 | Carrick et al. | |
| 4,950,999 A | 8/1990 | Agnello et al. | |
| 5,005,210 A | 4/1991 | Ferrell | |
| 5,353,346 A | 10/1994 | Cox et al. | |
| 5,719,584 A | 2/1998 | Otto | |
| 5,912,922 A | 6/1999 | Koszarsky et al. | |
| 5,977,913 A | 11/1999 | Christ | |

(Continued)

OTHER PUBLICATIONS

P. Krishnan et al., "A System for LEASE: Location Estimation Assisted by Stationary Emitters for Indoor RF Wireless Networks", IEEE Infocom, 2004.

(Continued)

*Primary Examiner*—Thomas H. Tarcza
*Assistant Examiner*—Fred H. Mull
(74) *Attorney, Agent, or Firm*—Edell, Shapiro & Finnan, LLC

(57) ABSTRACT

A device and method are provided for estimating a position of a target device (e.g., a device emitting radio frequency energy) based on data pertaining to strength of an emission received from the target device. At a mobile device, emissions are received from the target device when the mobile device is at each of a plurality of positions to produce receive signal strength data representative thereof. The mobile device, also recieves signals from each of a plurality of reference devices at a corresponding known position when the mobile device is at each of the plurality of positions. The position of the target device is estimated based on receive signal strength data associated with received emissions from the target device and from the reference devices. Using the estimated position and estimated transmit power of the target device, a zone of impact of the target device is determined with respect to other wireless activity based on the estimated position and estimated transmit power of the target device.

70 Claims, 19 Drawing Sheets

U.S. PATENT DOCUMENTS

| | | | |
|---|---|---|---|
| 6,130,907 | A | 10/2000 | Chen |
| 6,229,997 | B1 | 5/2001 | Addy |
| 6,233,529 | B1 | 5/2001 | Nonaka |
| 6,249,252 | B1* | 6/2001 | Dupray ................. 342/450 |
| 6,332,076 | B1* | 12/2001 | Shah et al. ............. 455/423 |
| 6,340,928 | B1 | 1/2002 | McCurdy |
| 6,484,111 | B1 | 11/2002 | Nara |
| 6,493,629 | B1 | 12/2002 | Van Bosch |
| 6,584,419 | B1 | 6/2003 | Alexander |
| 6,674,403 | B2 | 1/2004 | Gray et al. |
| 6,697,013 | B2 | 2/2004 | McFarland et al. |
| 6,714,605 | B2 | 3/2004 | Sugar et al. |
| 6,850,735 | B2 | 2/2005 | Sugar et al. |
| 6,990,428 | B1* | 1/2006 | Kaiser et al. ............ 342/450 |
| 2003/0123420 | A1* | 7/2003 | Sherlock ................. 370/338 |
| 2003/0198304 | A1 | 10/2003 | Sugar et al. |
| 2003/0224741 | A1 | 12/2003 | Sugar et al. |
| 2004/0028003 | A1 | 2/2004 | Diener et al. |
| 2004/0028123 | A1 | 2/2004 | Sugar et al. |
| 2004/0029558 | A1* | 2/2004 | Liu ...................... 455/456.1 |
| 2004/0072577 | A1 | 4/2004 | Petri et al. |
| 2004/0087316 | A1 | 5/2004 | Caci |
| 2004/0137915 | A1 | 7/2004 | Diener et al. |
| 2004/0156440 | A1 | 8/2004 | Sugar et al. |
| 2004/0203826 | A1 | 10/2004 | Sugar et al. |
| 2004/0203841 | A1 | 10/2004 | Bayder |
| 2004/0219885 | A1 | 11/2004 | Sugar et al. |
| 2004/0235497 | A1* | 11/2004 | Zekavat ................ 455/456.1 |
| 2005/0073983 | A1 | 4/2005 | Diener |
| 2005/0227625 | A1 | 10/2005 | Diener |
| 2005/0285792 | A1 | 12/2005 | Sugar et al. |

OTHER PUBLICATIONS

S. Ganu et al., "Infrastructure-Based Location Estimation In WLAN Networks", IEEE Wireless Communication and Networking Conference, Mar. 2004.

M. Youssef, "WLAN Location Determination via Clustering and Probability Distributions", IEEE Percom, Mar. 2003.

A. Agrawala, "Location and Time In Wireless Environments", UMD MIND Lab Presentation, 2003.

P. Bahl et al., "RADAR: An In-Building RF-Based User Location and Tracking System", IEEE Infocom. Mar. 2000.

P. Bahl et al., "Enhancements to the RADAR User Location and Tracking System", Microsoft Research Technical Report, Feb. 2000.

P. Prasithsangaree et al., "On Indoor Position Location With Wireless LANs", IEEE PIMRC Conference, 2002.

Christ et al., "A Prison Guard Duress Alarm Location System", Proc. IEEE International Carnahan Conference on Security Technology, Oct. 1993.

Kaemarungsi et al., "Modeling of Indoor Positioning Systems Based on Location Fingerprinting ," IEEE Infocom, Hong Kong, Mar. 2004.

Gwon et al., "Robust Indoor Location Estimation of Stationary and Mobile Users," IEEE Infocom, Hong Kong Mar. 2004.

M. Youssef et al., "On the Optimality of WLAN Location Determination Systems," Communication Networks and Distributed Systems Modeling and Simulation Conference, Jan. 18-24, 2004, San Diego, California.

Howard et al., "An Experimental Study of Localization Using Wireless Ethernet", International Conference on Field and Service Robotics, 2003.

Tao et al., "Wireless LAN location-sensing for security applications", Wireless Security Workshop, 2003.

Teemu Tonteri., "A Statistical Modeling Approach to Locatin Estimation," Master's Thesis, University of Helsinki, Department of Computer Scince, May 25, 2001.

Battiti et al., "Statistical Learning Theory for Location Fingerprinting in Wireless LANs," Technical Report DIT-02-0086, 2002.

P. Myllymaki et al., "A Probabilistic Approach to WLAN User Location Estimation," The Third IEEE Workshop on Wireless LANs, 2001.

Calvert, "Wireless Location Determination: Using Existing 802.11 Wireless Networks to Determine a User's Location," UCR, 2004.

* cited by examiner

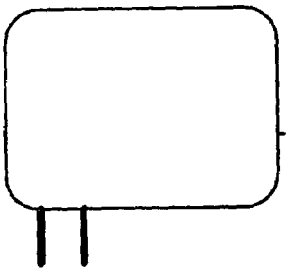
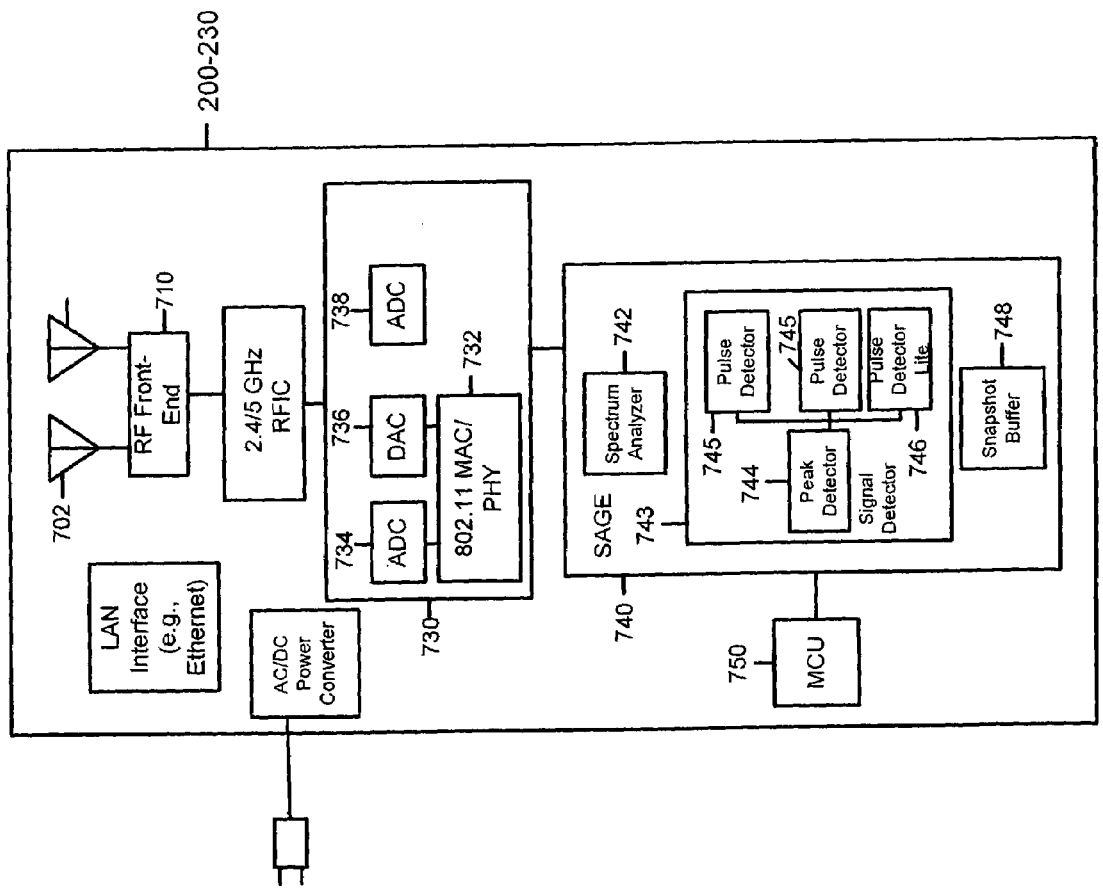

SELF-CALIBRATED PATH LOSS POSITION ESTIMATION AND ZONE OF IMPACT DETERMINATION

RELATED APPLICATIONS

This application claims priority to U.S. Provisional Application No. 60/582,317, filed Jun. 23, 2004, to U.S. Provisional Application No. 60/648,993, filed Jan. 31, 2005, and to U.S. Provisional Application No. 60/684,966, filed May 27, 2005. The entirety of these applications is incorporated herein by reference.

This application is also a continuation-in-part of U.S. patent application Ser. No. 10/976,509, filed Oct. 29, 2004, the entirety of which is incorporated herein by reference.

BACKGROUND OF THE INVENTION

Technology for determining the location or position of devices that emit radio signals has the potential to provide a wide variety of location-specific applications. For example, in cellular telephone communication networks, the ability to locate a cellular telephone is a critical requirement of emergency (e911) responder systems. Such location systems employ location techniques, many of which are suitable for cellular telephone applications where location precision is not a requirement.

Radio location techniques for indoor radio applications, such as wireless local area networks (WLANs), require generally higher location precision. Some of these location technologies use time-of-arrival (TOA) or time-difference-of-arrival (TDOA) with respect to signals emitted by the device to be located. Other location technologies rely on receive signal strength or path loss between the device to be located and reference devices at known positions that receive the signal emitted by the device.

There is room for improving the accuracy and reliability of location systems that use path loss information to determine the location of a device that emits radio signals detected by other devices at known positions. In particular, some receive signal strength location techniques heretofore known require laborious user assisted calibration of the system by physically walking a transmitter throughout the entire area of interest. Other techniques require numerous transmitter devices placed at known positions in order to assist in calibrating the system. This increases the cost of the system. Furthermore, some systems require imported coverage maps that require a user to manually import information about a space of interest using a software tool that requires the user to trace over a floor plan with a mouse, and to add to that data information describing walls, obstructions, etc.

SUMMARY OF THE INVENTION

Briefly, a device and method are provided for estimating a position of a target device (e.g., a device emitting radio frequency energy) based on data pertaining to strength of an emission received from the target device. At a mobile device, emissions are received from the target device when the mobile device is at each of a plurality of positions to produce receive signal strength data representative thereof. In addition, at the mobile device, signals are received from each of a plurality of reference devices at a corresponding known position (and transmitted with known transmit powers) when the mobile device is at each of said plurality of positions to produce receive signal strength data representative thereof. The position of the target device is estimated based on receive signal strength data associated with received emissions from the target device and receive signal strength data associated with received signals from the reference devices.

Also, a device and method are provided for determining an impact of a target device based on data pertaining to strength of an emission received from the target device. The method involves receiving an emission from the target device at each of a plurality of known positions to produce receive signal strength data. Using this data, an estimated position and an estimated transmit power of the target device are computed over a plurality of candidate positions and a plurality of candidate transmit powers of the target device based on the receive signal strength data. A zone of impact of the target device is determined with respect to other wireless activity based on the estimated position and estimated transmit power of the target device.

Objects and advantages of this invention may become more readily apparent when reference is made to the following description taken in conjunction with the accompanying drawings.

BRIEF DESCRIPTION OF THE DRAWINGS

FIG. 12 is a block diagram of a sensor device useful in connection with the location process.

FIG. 13 is a diagram depicting one physical configuration of the sensor as a wall outlet plug-in device.

DETAILED DESCRIPTION

The position/location estimation system and method described herein uses received signal strength (RSS) of the signal emitted by the device to be located (target device) and does not require the aforementioned laborious offline calibration or imported coverage maps. The algorithm may be implemented in two phases, an offline phase for sensor self-calibration, and an online phase for real-time position estimation.

The System in General

Figure 1:
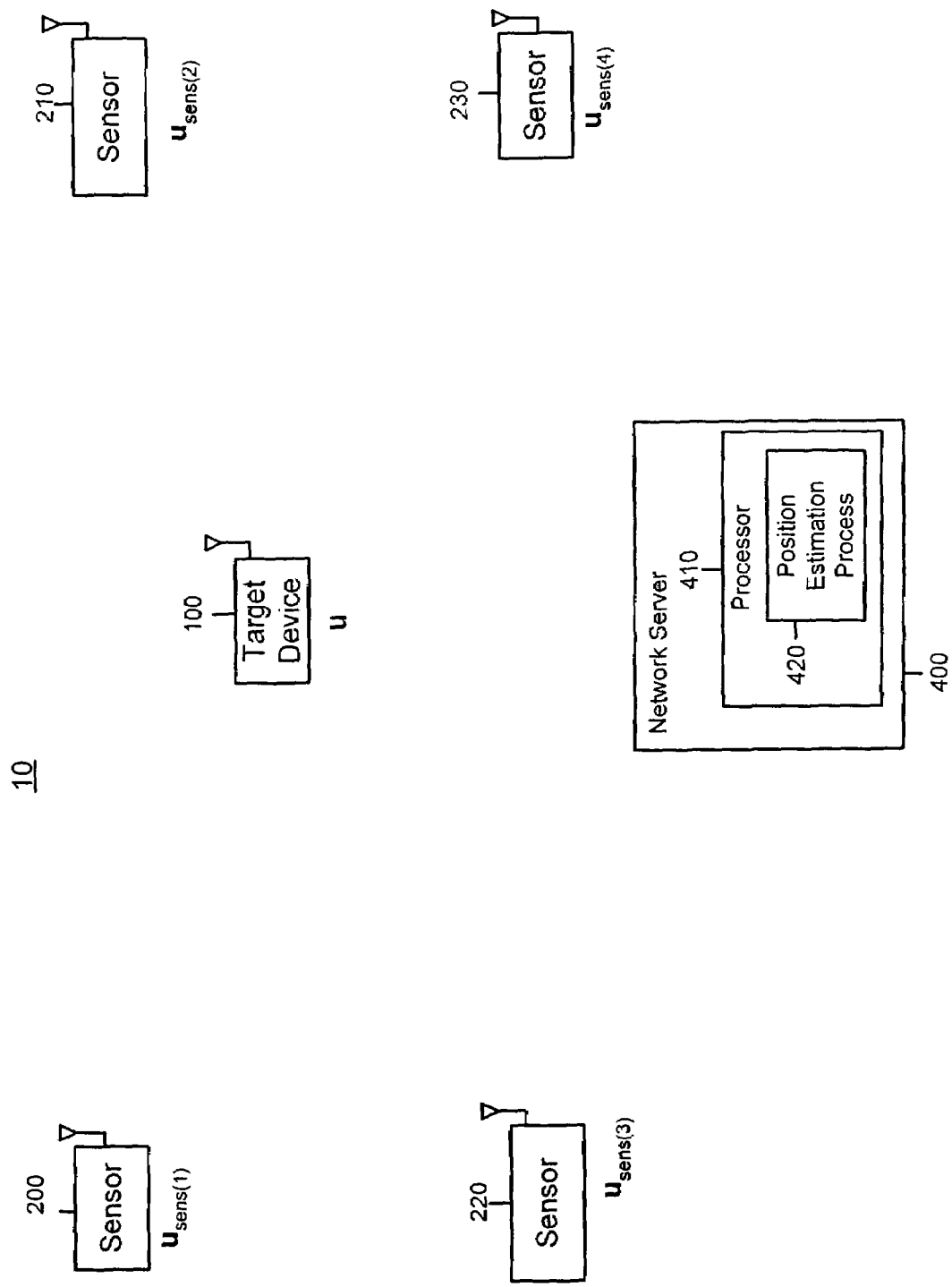
FIG. 1 is a block diagram of a location system.

With reference to FIG. 1, a system 10 is shown comprising a plurality of radio sensor devices (sensors) 200, 210, 220 and 230 and a server computer 400. The sensors are deployed at known positions. Sensors can both transmit and receive signals from each other and receive signals from the device to be located, called a target device 100. For example, sensor 200 is at position $u_{sens1}$, sensor 210 is at position $u_{sens2}$, sensor 220 is at position $u_{sens3}$ and sensor 230 is at position $u_{sens4}$. An example of a sensor is described hereinafter in conjunction with FIGS. 12 and 13. The target device 100 is the device to be located and is at an unknown position u. Sensors 200-230 connect to the server 400 via either a wired or wireless connection. The number of sensors may vary with the particular physical environment in which the location process is to be executed. However, it is desirable to make the cost of the sensors as low as possible so that more can be deployed without a significant system cost impact.

The server 400 includes a processor 410 that executes a position estimation process 420 that includes both the self-calibration offline phase and the online position estimation phase.

The techniques described herein are applicable to many applications where the target device emits radio energy. For example, the target device may be a wireless communication device that transmits a signal according to a wireless communication protocol that the sensors also recognize and operate on. In this sense, one or more sensors may initiate an exchange of signals with the target device in order to solicit transmissions from it, from which RSS measurements can be made at the sensors. An example of such a protocol is an IEEE 802.11 WLAN protocol. A sensor may transmit a data packet that the target device responds to with an acknowledgment message. Alternatively, a request-to-send/clear-to-send exchange may be initiated by a sensor. However, it is not necessary that a sensor initiate an exchange with the target device. The sensors may simply listen for transmissions or emissions from the target device. Moreover, the target device may be a device that emits radio energy that is not consistent or the same as the wireless communication protocol used by the sensors. For example, the target device may be a device that emits energy that interferes with the operation of IEEE 802.11 WLAN, such as a microwave oven, Bluetooth™ device, cordless telephone, wireless video camera, etc.

Theory of Operation

Let U be a random vector (2- or 3-dimensions) denoting the unknown target position, and let R be a random vector denoting the RSS information from the sensors. The following is a model for the dependence of R on U:

$$R = P_{Tx} \cdot 1 - [L(U, u_{sens(1)}) \ldots L(U, u_{sens(N)})]^T + N$$

where $P_{Tx}$ represents the (unknown) target transmit power in dBm, $U_{sens(i)}$ is the (known) position of the ith sensor for i=1 to N, 1 is the all-ones column vector, N is a vector of lognormal AWGN samples in dB to represent lognormal fading and shadowing, and $L(U, u_{sens(i)})$ represents the path loss between sensor(i) and the position U, not accounting for effects of fading or shadowing. An improvement to this model that takes into account the receiver noise floor of each sensor is $$R = 10 \log_{10} [10^{0.1(P_{Tx} \cdot 1 - [L(U, u_{sens(1)}), \ldots, L(U, u_{sens(N)})]^T)} + 10^{0.1 \cdot NF}] + N \quad (1)$$

where NF is the (known) noise floor in dBm at each sensor.

Given an RSS observation r, the position estimation algorithm picks the most likely position u* over all candidate positions and transmit powers, i.e., $$u_* = \arg\max_u \max_{P_{Tx}} Pr(U = u \mid R = r) \quad (2)$$

If the candidate positions are equally likely and the components of the AWGN vector N have equal variance, it is straightforward to show that (2) is equivalent to:

$$u_* = \arg\min_u \min_{P_{Tx}} \|r - \tilde{r}(u, P_{Tx})\|^2, \quad (3)$$

where $$\tilde{r}(u, P_{Tx}) \triangleq 10 \log_{10}[10^{0.1(P_{Tx} \cdot 1 - [L(u, u_{sens(1)}), \ldots, L(u, u_{sens(N)})]^T)} + 10^{0.1 \cdot NF}] \quad (4)$$

The actual path loss $L(u, u_{sens(j)})$ between position u and sensor(j) is unknown, but an estimate $\hat{L}$ can be obtained by employing an indoor path loss model to generate a rough estimate of the path loss, and an additive correction term to get the model to agree with the measured path loss data at the sensor locations. This technique is described in detail below.

Let Lmodel($u_1$, $u_2$)=PathLossFunc($\|u_1-u_2\|$) denote an estimate of the path loss between two arbitrary positions $u_1$ and $u_2$ based on a path loss model. The path loss model is implemented in the function PathLossFunc and uses only the distance between the two positions to estimate the path loss. One example of an indoor path loss model is described in "900 MHz Path Loss Measurements and Prediction Techniques for In-Building Communication System Design," Seidel, et al., Proc. 41st IEEE VTC Conference, 1991. This path loss model can be expressed as follows:

Path Loss[dB]=P1[dB]+27.6 ·log 10(d), where d is the distance between the emitter and the receiver, and P1 is the path loss at 1 meter which depends on transmit and receive antenna gains, and the frequency of the target transmit signal.

Another path loss model is described in "Coexistence between Bluetooth and IEEE 802.11 CCK Solutions to Avoid Mutual Interference", A. Kamerman, Lucent Technologies Bell Laboratories, January 1999. This path loss model uses a line-of-sight assumption (path loss coefficient=2.0) for the first 8 meters, and a larger path loss coefficient beyond 8 meters to account for walls, etc.:

Path Loss [dB]=$P1$[dB]+20·log 10($d$) if $d$<8m

Path Loss [dB]=$P1$[dB]+20·log 10(8)+33·log 10($d$/8) otherwise.

Still another path loss model approach is to assume a two-coefficient model of the form:

Path Loss [dB]=$C_0$+$C_1$·log 10($d$), and to solve for the $c_0$ and $c_1$ that form a best-fit line through the measured path loss data from the sensor self-calibration measurements. For example, a single-breakpoint model may be defined as follows:

$$L_{model}(d) = \begin{cases} C_0 + 10 \cdot C_1 \cdot \log_{10}(d) & \text{if } d < d_0 \\ C_0 + 10 \cdot C_1 \cdot \log_{10}(d_0) + 10 \cdot C_2 \cdot \log_{10}\left(\frac{d}{d_0}\right) & \text{otherwise} \end{cases}$$

where $d_0$ is the breakpoint distance in meters, $C_0$ is the path loss at 1 meter, $C_1$ is the path loss slope for distances under $d_0$ meters, and $C_2$ is the path loss slope beyond $d_0$ meters.

Moreover, multiple path loss models may be used. For example, one path loss model may be used for areas with low obstruction densities (e.g., open areas or hallways), another path loss model for high obstruction densities (cubicles, walls, etc). The specific $C_0$, $C_1$ $_{and}$ $_{C2}$ values for these parameters at 2.4 GHz were found empirically and are listed below:

Low Obstruction Density: $C_0$=20 dB, $C_1$=2.0 dB/meter, $C_2$=2.3 dB/meter

High Obstruction Density: $C_0$=40 dB, $C_1$=2.0 dB/meter, $C_2$=3.3 dB/meter

Continuing with the development for the path loss estimate $\hat{L}$, let E be the path loss error matrix defined by $E_{i,j}=[e_1 \ldots e_N]^T=Lmeas(u_{sens(i)},u_{sens(j)})-Lmodel(u_{sens(i)},u_{sens(j)})$ where $Lmeas(u_{sens(i)}, u_{sens(j)})$ is the measured path loss between sensor(i) and sensor(j) when sensor(j) receives a test signal from sensor(i). When i=j, $Lmeas(u_{sens(i)}, u_{sens(j)})$=0. The measurement assumes that averaging is performed (ideally with antenna diversity and/or with frequency diversity by transmitting a broadband signal during calibration) during the measurement to mitigate the effects of fading or shadowing. Note that with an appropriate amount of averaging, it is reasonable to assume that the measured path loss and the actual path loss are the same, i.e., $Lmeas(u_{sens(i)}, U_{sens(j)})=L(u_{sens(i)}, u_{sens(j)})$.

The jth column of the path loss error matrix defined above, $e_j$, represents the error between the path loss model and the actual (measured) path loss, when the path loss is measured at each of the sensor positions relative to sensor (j). For convenience, $e_j$ is referred to as "the path loss error relative to sensor (j)."

Figure 2:
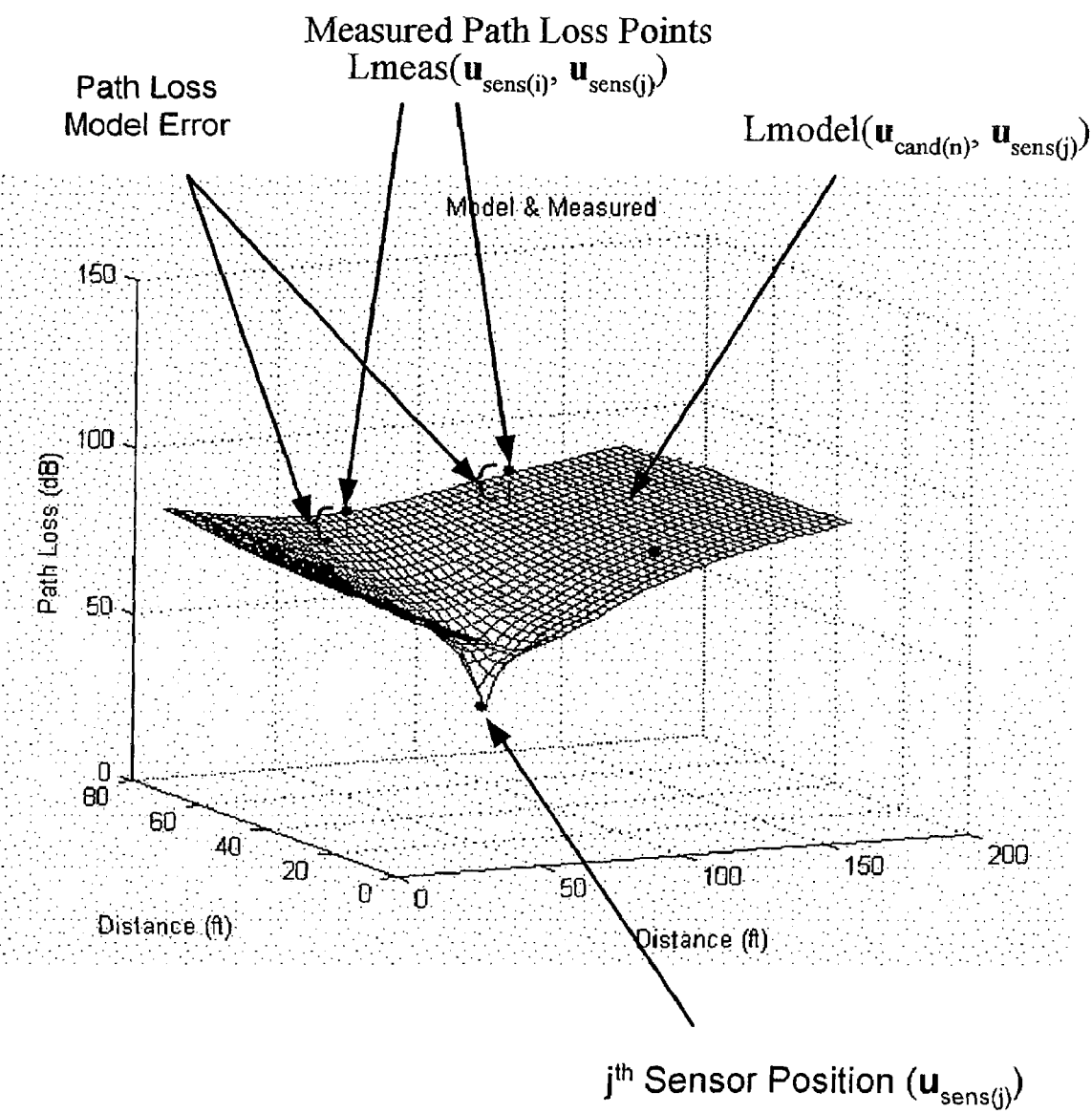
FIGS. 2-4 are diagrams illustrating forms of path loss derived between an arbitrary position and a sensor produced according the algorithms described herein, for the purpose of determining the position of a target device.

FIG. 2 illustrates the measured path loss between each of the sensors and sensor (j), and also the modeled path loss obtained by evaluating the path loss model PathLossFunc between candidate positions u=$u_{cand(n)}$ and $u_{sens(j)}$.

The estimate $\hat{L}$ for the path loss $L(u,u_{sens(j)})$ between position u and sensor(j) can now be defined as follows:

$$\hat{L}(u, u_{sens(j)}) \triangleq Lmodel(u, u_{sens(j)}) + Interp(u, u_{sens(1)}, \ldots, u_{sens(N)}, e_j) \quad (5)$$

Figure 3:
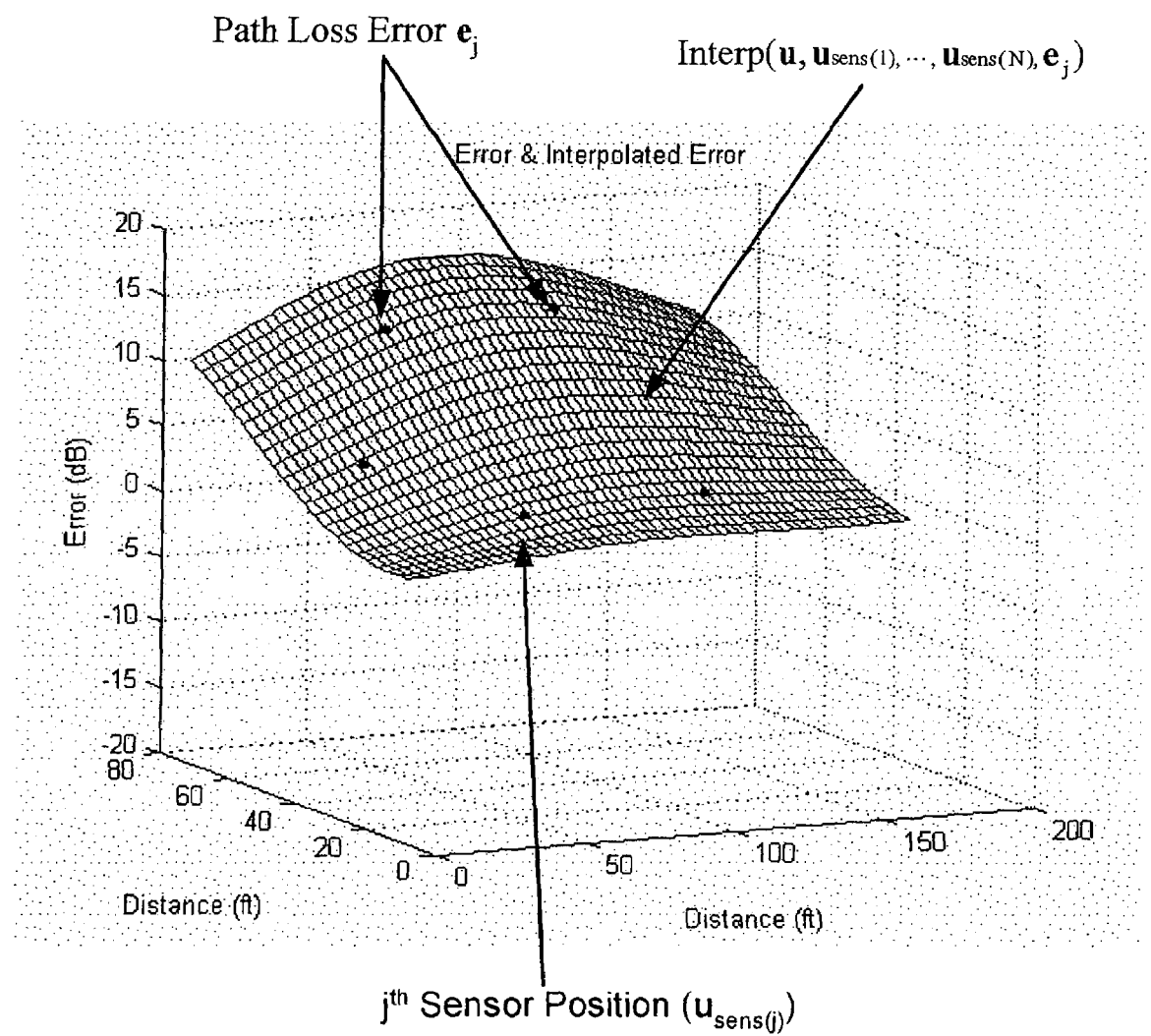
Figure 4:
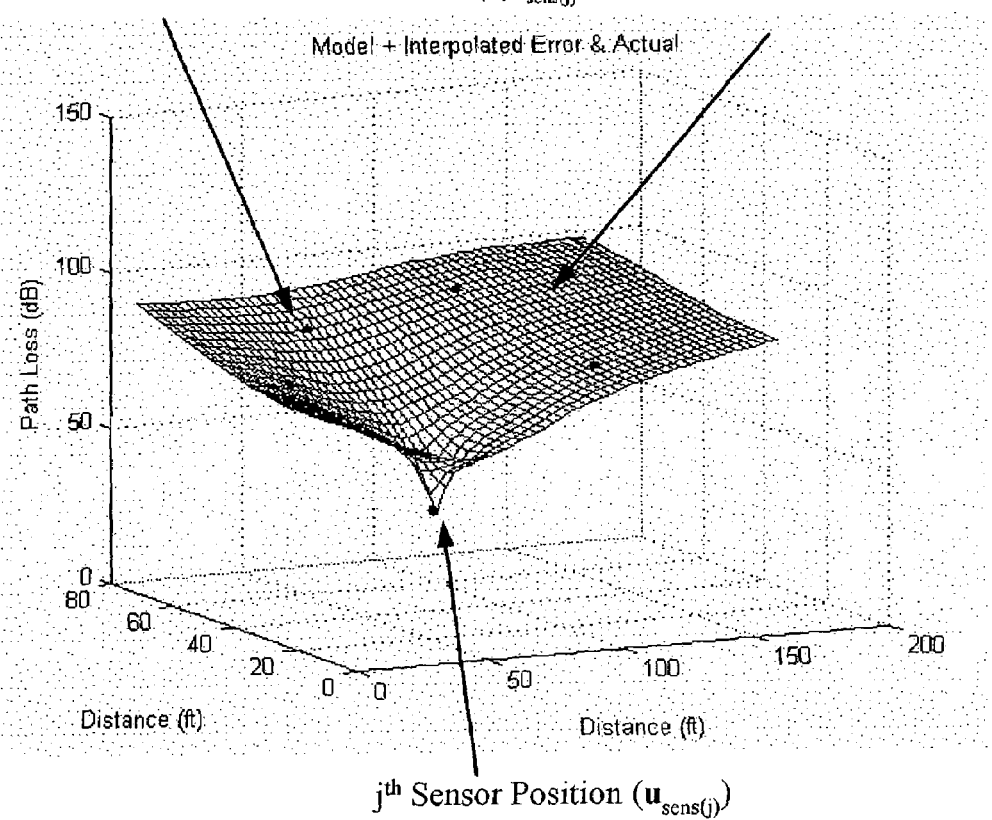

In the second term of the above equation, multi-dimensional interpolation is used to interpolate the path loss error relative to sensor (j) between the positions at which the error is known (i.e., at the sensor positions) to form an estimate of the error at position u. FIG. 3 illustrates the path loss error relative to sensor (j), $e_j$, and the interpolated path loss error relative to sensor(j), $Interp(u,u_{sens(1)}, \ldots, u_{sens(N)}, e_j)$. FIG. 4 illustrates the path loss estimate $\hat{L}(u,u_{sens(j)})$. Data of the type represented by FIGS. 2-4 is produced for each sensor (j).

One example of a multi-dimensional interpolation technique useful for the Interp( ) function is known as "Kriging", and is described in "DACE: A MATLAB Kriging Toolbox," Version 2.0, Aug. 1, 2002, Lophaven, H. Nielsen, J. Søndergaard, Department of Informatics and Modeling, Technical University of Denmark. A number of other well-known multi-dimensional interpolation techniques can be used for this application, such as Akima splines, bi-linear interpolation, etc.

Substituting $\hat{L}$ for L in equation (4), the position estimator can now be defined as follows:

$$u_* = \arg\min_u \min_{P_{Tx}} \|r - \hat{r}(u, P_{Tx})\|^2, \quad (7)$$

where $$\hat{r}(u, P_{Tx}) \triangleq 10 \log_{10}[10^{0.1(P_{Tx} \cdot 1 - [\hat{L}(u,u_{sens(1)}), \ldots, \hat{L}(u,u_{sens(N)})]^T)} + 10^{0.1 \cdot NF}] \quad (8)$$

The position estimation algorithm selects the candidate position u* that is associated with the closest RSS in Euclidean distance to the RSS observation vector r using equation (7). Said another way, the position estimation algorithm computes a most likely position over a plurality of candidate positions and a plurality of candidate transmit powers of the target device based on the receive signal strength data at the known sensor positions. This could be done either by evaluating equation (7) over a grid of candidate positions u={$u_{cand(n)}$}, or by using an iterative multi-dimensional minimization algorithm, such as the Simplex Method, Powell's Method, or Simulated Annealing as described in Numerical Recipes in C, The Art of Scientific Computing, Press et al., Cambridge University Press, 1992.

An improvement of this process is to collect a sequence $r_n$ of RSS observations from multiple transmissions by a target device instead of a single observation. A Maximum Likelihood Sequence Estimation (MLSE) algorithm is employed to produce the following generalization of equation (7) for a sequence of observations:

$$u_* = \arg\min_u \min_{P_{Tx}} \sum_{n=1}^{N_{seq}} \|r_n - \hat{r}(u, P_{Tx})\|^2, \quad (9)$$

for a block of $N_{seq}$ observations $r_1, \ldots, r_{Nseq}$, or $$u_* = \arg\min_u \min_{P_{Tx}} LPF_n(\|r_n - \hat{r}(u, P_{Tx})\|^2), \quad (10)$$

using a bank of lowpass filters (one filter for each candidate (U,$P_{Tx}$) pair) to replace the sum in equation (5). Using this approach, the ML position estimate is the position that corresponds to the filter having the smallest output. The time constant of the filters should be small enough to give good averaging but large enough to accommodate any motion of the target.

Still another modification of the basic process is when each sensor has multiple antennas and receive antenna diversity capability. Diversity may be achieved by selection diversity or full simultaneous receive diversity (e.g., a receiver for each antenna path). RSS data is observed from multiple antennas on sensor devices from one or more transmissions (or emissions) by a target device. Using $\{r1_n\}, \ldots, \{rP_n\}$ to denote RSS observation sequences from P antennas, the MLSE estimator for the P antenna case is $$u_* = \arg\min_u \min_{P_{Tx}} \sum_{n=1}^{Nseq} [\|r1_n - \hat{r}(u, P_{Tx})\|^2 + \cdots + \|rP_n - \hat{r}(u, P_{Tx})\|^2], \quad (11)$$

for a block of Nseq observations, and $$u_* = \arg\min_u \min_{P_{Tx}} LPF_n(\|r1_n - \hat{r}(u, P_{Tx})\|^2 + \cdots + \|rP_n - \hat{r}(u, P_{Tx})\|^2), \quad (12)$$

using the LPF approach. In fact, equation (11) is a generalized statement of the position estimator described herein, where equation (7) is a special case of equation (11). An alternative expression for equation (9) which integrates out the unknown transmit power rather than selecting the Tx power with minimum MSE:

$$u_* = \arg$$

$$\max_u \int_{P_{Tx}} \exp\left(-\sum_{n=1}^{Nseq} [\|r1_n - \hat{r}(u, P_{Tx})\|^2 + \cdots + \|rP_n - \hat{r}(u, P_{Tx})\|^2]/2\sigma^2\right) \cdot f_{P_{Tx}}(p_{Tx}) \cdot dp_{Tx}$$

In the above expression, $\sigma^2$ represents the noise variance of the RSS estimate (empirically, $\sigma$ has been shown to be close to 5 dB), and $f_{P_{Tx}}(p_{Tx})$ is the marginal probability density for the transmit power $P_{Tx}$. The expression to the LPF approach (8) is identical to the above expression, except the summation is replaced by an LPF operator.

With respect to equation (12), two lowpass filters, which may be referred to as "slow" and "fast" may be used in practice to track fast target movements without introducing large position estimate variations. The input RSS data is applied to both the filters to produce estimates $u^*_{slow}$ and $u^*_{fast}$. Nominally $u^*_{slow}$ is used as the final estimate of the target location. However, if the difference between the two estimates is greater than the threshold $(r_{thresh})$ $u^*_{fast}$ is used as the output and the state of the fast filter is loaded to that of the slow filter.

Another form for the position estimator is as follows:

$$u_* = \qquad\qquad (13)$$
$$\arg\min_u \min_{model} \min_{P_{Tx}} LPF_n(\|r1_n - \hat{r}(u, P_{Tx})\|^2 + \cdots + \|rP_n - \hat{r}(u, P_{Tx})\|^2)$$

An additional minimization step over path loss models is added in equation (13) to search over two or more two different path loss models. For example, a low obstruction density path loss model and a high obstruction density path loss model may be used as referred to above, and minimization performed as indicated in equation (13) over these two models.

System Implementation

Figure 5:
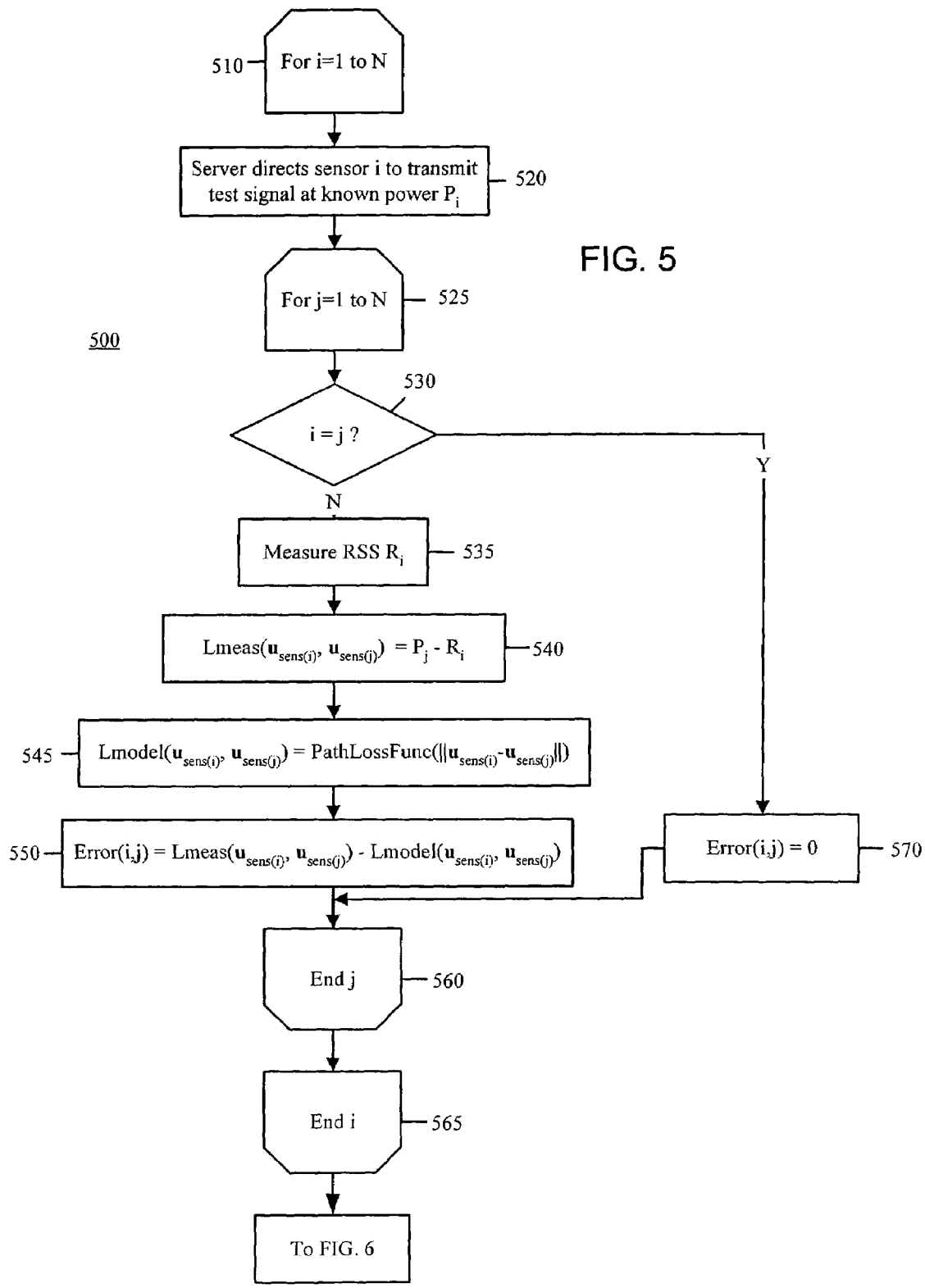
FIGS. 5 and 6 are flow charts depicting steps that may be performed to compute path loss estimate data during a self-calibration phase.
Figure 6:
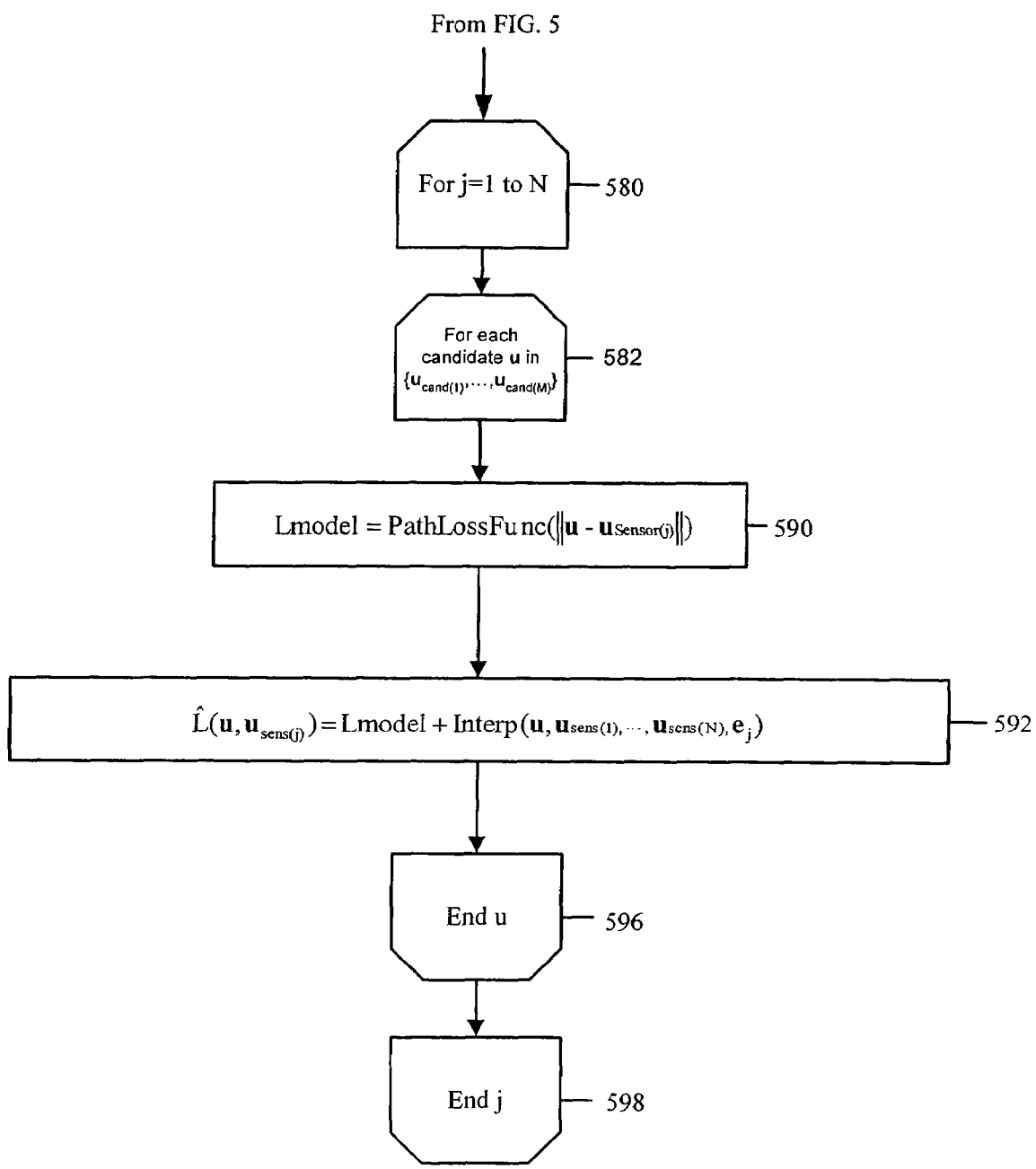

FIGS. 5 and 6 illustrate a flow chart for a self-calibration phase that may be computed "off-line", i.e., prior to (or during times other than) determining the position of a target device. Parameters computed during this phase include the measured path loss between sensors, $Lmeas(u_{sens(i)}, u_{sens(j)})$, the modeled path loss between sensors, $Lmodel(u_{sens(i)}, u_{sens(j)})$, and the path loss error matrix E. The ultimate output of this calibration step and the flowchart in FIG. 6 is the path loss estimate $\hat{L}(u_{cand(n)}, u_{sens(j)})$ between each sensor and a number of candidate target positions $u_{cand(n)}$.

The self-calibration process 500 begins in FIG. 5. As shown by step 510, for each sensor(i) for i=1 to N, the server in step 520 directs sensor(i) to transmit a test signal at a known power $P_i$. Then at each of the other sensors, sensor(j), for j=1 to N (step 525) where i is not equal to j (step 530), the received signal strength (RSS)$R_i$ is measured in step 535. Then, in step 535, given knowledge of the RSS $R_i$, a measured path loss $Lmeas(u_{sens(i)}, U_{sens(j)})$ between sensor (i) and sensor(j) is computed. Next, in step 545, a path loss model PathLossFunc is evaluated for the distance between sensor(i) and sensor(j), to produce path loss model data $Lmodel(u_{sens(i)}, u_{sens(j)})$. Then, in step 550, a path loss error Error(i,j) is computed between the measured path loss (between sensor(i) and sensors(j)), $Lmeas(u_{sens(i)}, u_{sens(j)})$ and the path loss model data for distance between sensor(i) and sensor(j), $Lmodel(u_{sens(i)}, u_{sens(j)})$. This process is repeated for all i, 1 to N, and all j, 1 to N, to cover each sensor acting as a source of a test signal with respect to the other sensors acting as receive devices for each test signal.

Reference is now made to FIG. 6. As shown by step 580, for j=1 to N, and step 582, for each of a plurality of candidate position u in the set of candidate positions $u_{cand(1)}$ to $U_{cand(M)}$, in step 590, the path loss function PathLossFunc is evaluated between the position of sensor(j) and each candidate position to produce path loss model data Lmodel based on the distance between sensor(j) and each corresponding candidate position. Next, in step 592, an interpolated path loss error relative to sensor(j), $Interp(u_{sens(1)}, \ldots, u_{sens(N)}, e_j)$, is computed, and a path loss estimate $\hat{L}(u, u_{sens(j)})$ is computed between a candidate position and sensors) by adding the interpolated path loss error relative to sensor(j) to the path loss data, Lmodel, obtained by evaluating the path loss model based on a distance between a position of sensor(j) and the candidate position. As indicated by steps 596 and 598, for each sensor(j), steps 590 and 592 are repeated for all candidate positions u in the set $\{u_{cand(1)}, \ldots, u_{cand(M)}\}$ to produce a path loss estimate $\hat{L}(u_{cand(1)}, u_{sens(j)}), \ldots, \hat{L}(u_{cand(M)}, u_{sens(j)})$.

The self-calibration path loss estimation process of FIGS. 5 and 6 can be summarized as a method for generating path loss estimate data associated with an area in which a plurality of radio sensor devices are deployed at known positions and used to determine a position of a target device in the area based on emissions received from the target device, the method comprising: with respect to a test signal transmitted by each radio sensor device, measuring path loss at each of the other radio sensor devices to measure the path loss between all combinations of pairs of radio sensor devices; evaluating a path loss model based on the distance between all combinations of pairs of radio sensor devices to produce path loss model data; computing, relative to each radio sensor device, a path loss error between the measured path loss and the path loss model data when the path loss is measured at each of the other radio sensor positions relative to that radio sensor device; interpolating a path loss error relative to each radio sensor device at a candidate position from the corresponding computed path loss errors; and computing a path loss estimate between a candidate position and each radio sensor device by adding the interpolated path loss error relative to a radio sensor device at the candidate position to path loss data obtained by evaluating the path loss model based on a distance between a position of the corresponding radio sensor device and the candidate position.

Figure 7:
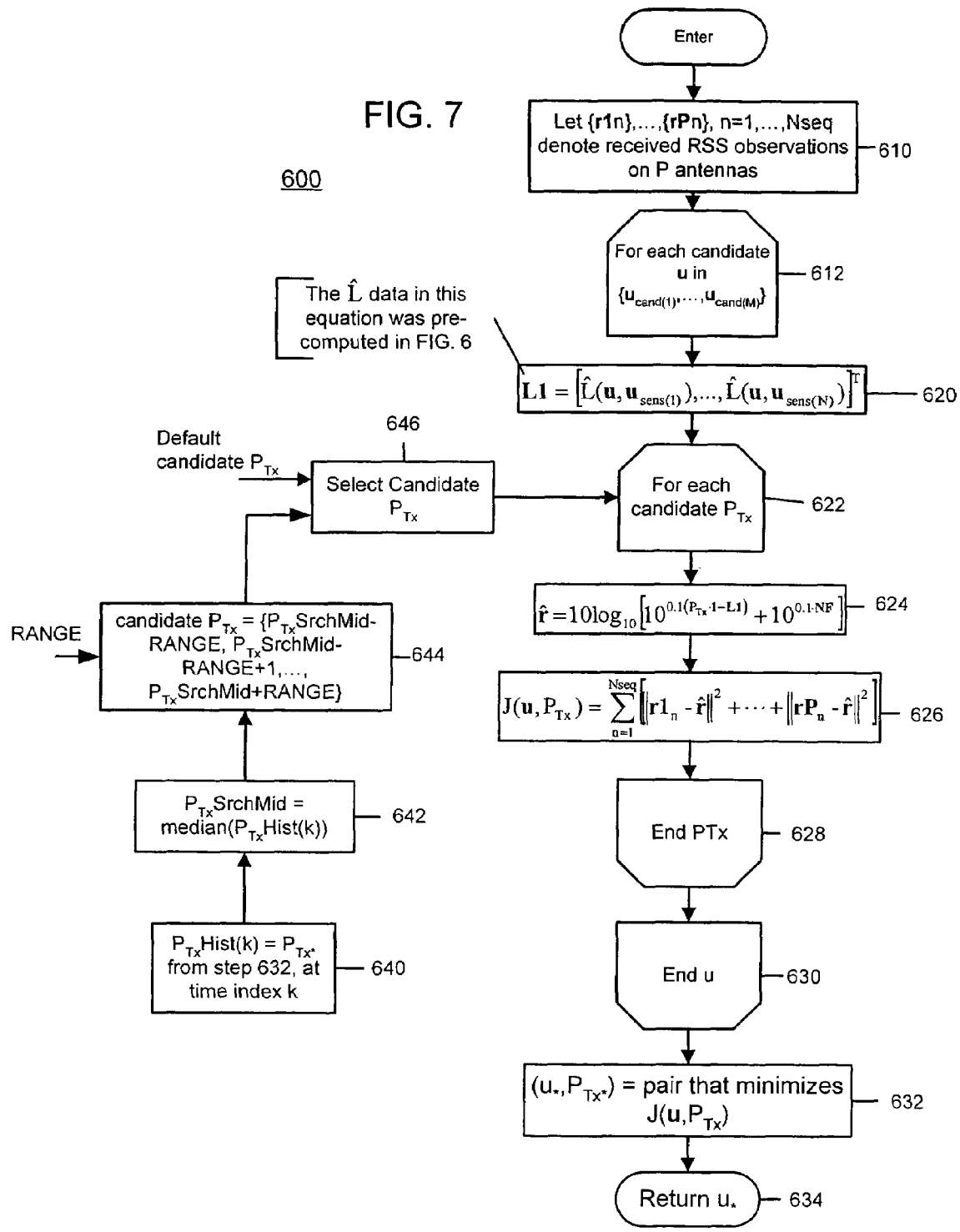
FIGS. 7 and 8 are flow charts depicting steps that may be performed to compute a position of the device using the path loss estimate data.
Figure 8:
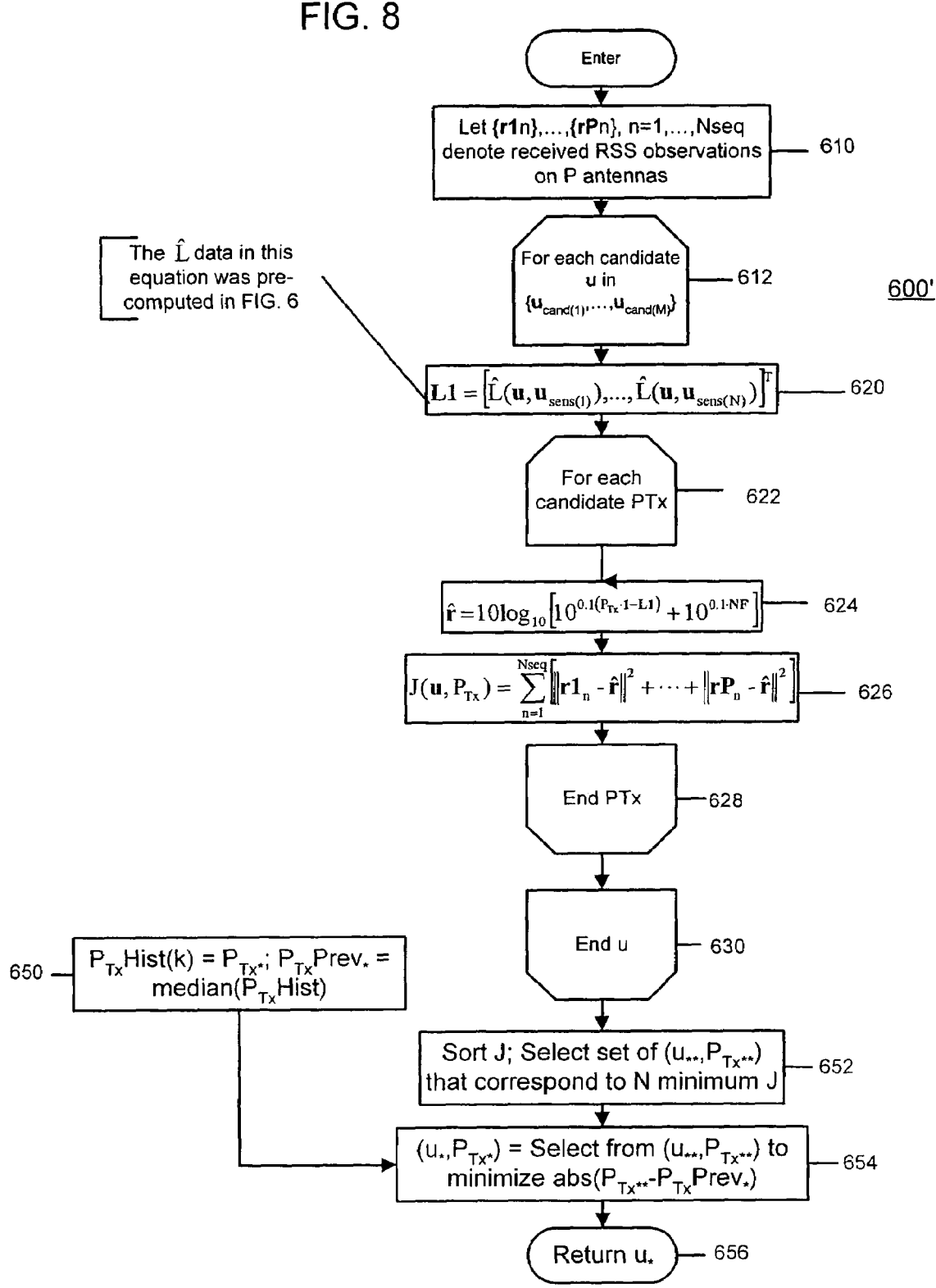

FIGS. 7 and 8 are flow charts for a position estimation phase 600, referred to as an "on-line" phase, where the path loss estimate computed in the self-calibration phase is used to estimate the position of a target device based on received signal strength observations at each of the sensors from a transmission or emission by the target device. FIGS. 7 and 8 are very similar to each other, but show different techniques for resolving position ambiguity using transmit power history information.

In step 610 of FIG. 7, a set of observation vectors {r1$n$}, ..., {rP$n$}, n=1 to Nseq of observations (received signal events), denoting RSS observations on P (one or more) antenna(s), are received as input to the position estimation process. As indicated by step 612, a series of computations are made for each candidate position u in the candidate position set $\{u_{cand(1)}, \ldots, u_{cand(M)}\}$. In step 620, a path loss estimate matrix L1 is assembled from the path loss estimates, whereby $L1=[\hat{L}(u,u_{sens(1)}), \ldots, \hat{L}(u,u_{sens(N)})]^T$; that is L1 is the path loss estimate matrix representing the path loss estimates at candidate position u with respect to each sensor position.

Then, as shown by step 622, for each candidate transmit power $P_{Tx}$ of the device to be located, several further computations are made. The derivation of the candidate transmit powers will be described hereinafter. In step 624, the intermediate vector $\hat{r}=10 \log_{10} [10^{0.1(P_{Tx}1-L1)}+10^{0.1 \cdot NF}]$ is computed from the path loss estimate matrix L1. Next, in step 626, the function $J(u, P_{Tx})$ is computed as shown. As shown by step 630, steps 620-626 are performed for each candidate position u in the candidate position set $\{u_{cand(1)}, \ldots, u_{cand(M)}\}$. In step 632, the position/transmit power pair $(u^*, P_{Tx}^*)$ is the pair that minimizes the function $J(u, P_{Tx})$, where $u^*$ is the estimated position of the target device, which is returned in step 634.

Steps 640-646 illustrate one procedure for selecting the candidate transmit powers $P_{Tx}$ of the target device used in the computations shown in FIG. 7. In step 640, a history of candidate transmit powers, $P_{Tx}$Hist(k) for a target device is accumulated each time (represented by time index k) a position $u^*$ is computed for that target device in step 632. Next, in step 642, transmit power search median $P_{Tx}$Srch-Mid is computed for all k's. Then, using a programmable RANGE value that specifies a range or window for candidate transmit powers around the search median $P_{Tx}$SrchMid, in step 644, candidate transmit powers $P_{Tx}$ are derived as $\{P_{Tx}$SrchMid-RANGE, $P_{Tx}$SrchMid-RANGE+1, ..., $P_{Tx}$SrchMid+RANGE$\}$. These candidate transmit powers are then used for the computations in steps 624 and 626. The set of candidate transmit powers is updated each time a new position of that target device is computed, in step 632, and ultimately, after several position computations, the set of candidate transmit powers will converge. In step 646, either a default candidate transmit power $P_{Tx}$ or the set of candidate transmit powers (from step 644) is selected. For example, in step 646, the default candidate transmit power $P_{Tx}$ may be selected if the time index k is less than a certain number; otherwise, the set of candidate transmit powers $P_{Tx}$ computed in step 644 are used. This is useful to establish an initial or default candidate transmit power before any transmit power history has been built up for the particular target device whose position is being computed.

FIG. 8 illustrates estimation process 600' similar to process 600, except that a slightly different technique is used to derive the best candidate position/transmit power pair. Steps 610 through 630 are the same as the like numbered steps in FIG. 7. In step 650, candidate transmit power history $P_{Tx}$Hist (k) is accumulated in the same manner as described above in connection with FIG. 7. $P_{Tx}$Prev* is computed as the median of the transmit power history $P_{Tx}$Hist(k), over time index k. In step 652, the values of the J function (step 626) are sorted, and a set of N optimum candidate position/transmit power pairs denoted as $(u^{}, P_{Tx}^{})$ are selected that minimize the J function. In step 654, a best candidate position/transmit power pair $(u^*, P_{Tx}^*)$ is selected to minimize an absolute value of the difference between the candidate transmit power and a median of candidate transmit powers for the target device at prior estimated positions, abs($P_{Tx}^{**}-P_{TxPrev}^*$). The position $u^*$ in the best candidate position/transmit power pair $(u^*, P_{Tx}^*)$ is returned as the position estimate.

A purpose of steps 640-646 in FIG. 7 and steps 650-656 in FIG. 8 is as follows. Due to the unknown transmit power of the target device, the position estimation algorithm searches a set of candidate transmit powers and selects the transmit power that optimizes the selection criterion (e.g., mean square error). This can sometimes cause ambiguity in the estimated target location. The noted portions of the algorithm search for the transmit power that optimizes the mean square error between the computed signal strength and estimated signal strength. In addition, the solution achieved by the noted steps maintains a state of the optimum estimated transmit power as the target device moves about the search area. When estimating the position of the target device at a position that has an ambiguity point, the ambiguity point can be eliminated by using knowledge about the transmit power of the target device at prior position estimates.

Figure 9:
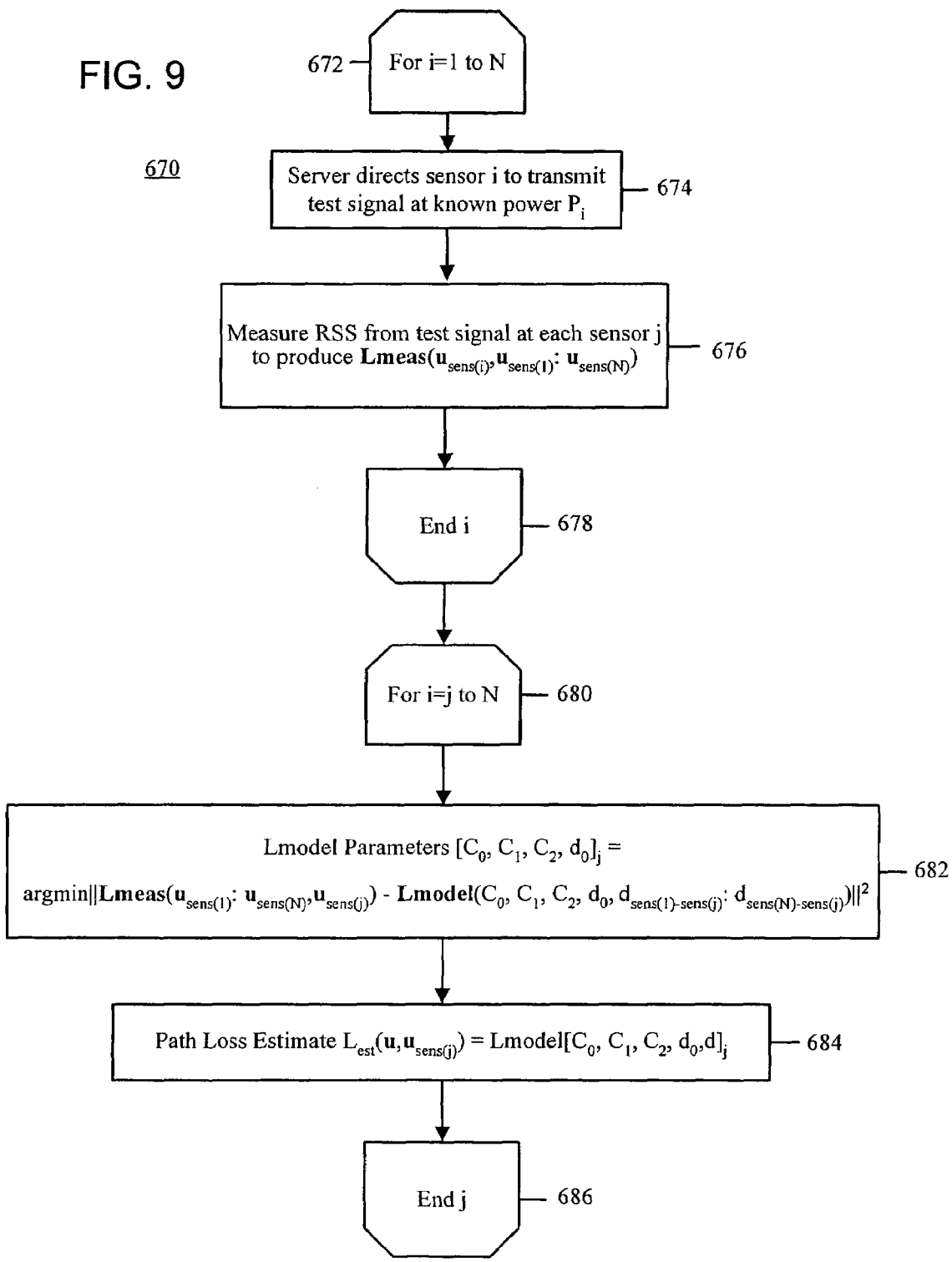
FIG. 9 is a flow chart illustrating another technique for estimating path loss between an arbitrary position and a sensor.

Another path loss estimate technique involves estimating the path loss between a point in space u and a sensor by fitting a path loss model to the conditions of the channel environment in which the sensors are deployed. FIG. 9 illustrates this alternative path loss estimation process 670, whereby the parameters for a path loss model, Lmodel, are computed based on RSS measurements taken with respect to each sensor in the deployment environment. Several path loss model examples are described above, each of which has one or more variable parameters, such as $C_0$, $C_1$, $C_2$, and do in the case of one exemplary path loss model. For explanatory purposes, a path loss model having these four parameters described above is used in FIG. 9, but this is only an example as these techniques may be employed with any other path loss model.

Steps 672 and 678 set up a loop in which the index i is associated with a transmitting sensor. In step 674, the server directs sensor i to transmit a test signal at a known power $P_i$. Each of the other sensors receives the test signal and in step 676, the RSS is measured at each sensor(j) (each of the other sensors) and the vector Lmeas($u_{sens(i)}, u_{sens(1)}: u_{sens(N)}$) which represents the path loss (computed by subtracting the RSS at sensor(j) from $P_i$) between sensor(i) and each sensors). Steps 674 and 676 are repeated for i=1 to N thereby building a vector of this type for each sensor(i).

Steps 680 and 686 define a loop in which the index(j) is associated with a sensor with respect to which a path loss estimate is to be computed from the data computed in step 676. In step 682, the path loss model parameters [$C_0, C_1, C_2, d_0$] for sensor(j) is estimated by minimizing the mean squared error between the measured path loss and the path loss model function. That is, in step 682, the minimum of the norm squared of the difference between the vector Lmeas ($u_{sens(1)}, u_{sens(N)}$: $u_{sens(j)}$) and Lmodel($C_0, C_1, C_2, d_0, d_{sens(1)-sens(j)}$ :$d_{sens(N)-sens(j)}$), is computed, where $d_{sens(1)-sens(j)}$:$d_{sens(N)-sens(j)}$ represents the distance between sensor(1) and sensors), the distance between sensor(2) and sensor(j), . . . , and the distance between sensor(N) and sensor(j), which are known quantities. The parameters $C_0, C_1, C_2, d_0$ are the variables to be computed by the argmin( ) operation for each sensor(j). Other arithmetic computations may be performed to solve for the parameters. In step 684, a path loss estimate $L_{est}(u, u_{sens(j)})$ is defined by evaluating the path loss model function Lmodel with the parameters $C_0, C_1, C_2, d_0$, for sensor(j), in other words, Lmodel[$C_0, C_1, C_2, d_0, d]_j$, where d is the distance between an arbitrary point in space (e.g., a candidate position) and the position of sensor j, $u_{sens(j)}$. Thus, each sensor(j) will have its own possibly unique set of path loss model parameters $C_0, C_1, C_2, d_0$.

The process 670 may be performed with any one or more path loss models for each sensor. It is another way of interpolating the path loss error between the measured path loss between the sensors and a path loss model for the corresponding distance. Furthermore, the process 670 may be performed after initial installation of the sensors at a particular site, or on an occasional basis thereafter to update the path loss model parameters for any changes or variations in the environment. In use, the path loss estimate $L_{est}(u, u_{sens(j)})$ is substituted in all respects in the position estimation processes of FIGS. 7 and 8 for the path loss estimate $\hat{L}(u, u_{sens(j)})$. Moreover, the process 670 may be performed in addition to the path loss estimation process of FIGS. 5 and 6, an average of the two path loss estimates is used for position estimation, or both path loss estimates are used to compute two position estimates.

To summarize the process depicted by FIG. 9, a method is provided for generating path loss estimate data associated with an area in which a plurality of radio sensor devices are deployed at known positions and used to determine a position of a target device in the area based on emissions received from the target device comprising: with respect to a test signal transmitted by each radio sensor device at a known position, measuring path loss at each of the other radio sensor devices to measure the path loss between all combinations of pairs of radio sensor devices; for each radio sensor device, deriving parameters for a path loss model function from the measured path loss between that radio sensor device and each of the other radio sensor devices; and computing a path loss estimate between a position and each radio sensor device by evaluating the path loss model function using the parameters derived for each radio sensor device. Said another way, the method comprises: with respect to a test signal transmitted from each known position, measuring path loss at each of the other known positions to measure the path loss between all combinations of pairs of known positions; for each known position, deriving parameters for a path loss model function from the measured path loss between that known position and each of the other known positions; and computing a path loss estimate between a candidate position and each known position by evaluating the path loss model function using the parameters derived for each known position.

Deriving the parameters may involve minimizing the mean squared error between the measured path loss and the path loss model function, that is, computing a minimum of a square of a norm of a difference between a vector representing measured path loss between a known position and each of the other known positions and a vector representing the path loss model function based on corresponding distances between the known position and each of the other known positions.

FIGS. 5-8 show examples of how to implement an algorithm that achieves the position estimator described above under "Theory of Operation". There are other ways to implement the position estimation algorithm without departing from the scope and spirit of the concepts described herein.

The processes described above in conjunction with FIGS. 2-9 may be extended to 3-dimensions in space. In that case, the measured data is between two 3-dimensional points ($u_1$ and $u_2$) in space, rather two 2-dimensional points. In addition, the path loss function model is evaluated with respect to the distance between 2 points in 3-dimensions, and ultimately the estimated path loss for a sensor is between a point in 3-dimensions and a sensor position, such that the resulting estimated path loss data is represented by a volume, rather than a surface (as shown in FIGS. 2-4).

The multiple observation and multiple-antenna sensor enhancements described above are useful in conjunction with the estimated path loss data produced according to the methodology of FIGS. 2-9, or with RSS calibration data obtained through any other means using techniques known in the art.

An advantage of the techniques for generating path loss estimates as described above (in conjunction with FIGS. 2-9) is that they reduce the costs, and/or relieve the user (or system installer) of the more laborious tasks associated with known calibration techniques (e.g., numerous sensors or transmit-only devices at known positions, walking a transmitter through an area, imported coverage maps, etc.). Both the interpolated error path loss estimation technique (FIGS. 5 and 6) and the path loss model parameter derivation technique (FIG. 9) use real path loss data representing the environment and conditions where position estimations are to be computed because it is performed after the sensors are installed for use at a site, and periodically or on occasion thereafter to update the path loss estimate according to changes conditions at the site. However, these techniques are not limited to self-calibration among the sensors. They may also be used to improve the performance of the known calibration techniques. For example, these techniques can be used to reduce the required number of calibration points, sensor devices and/or transmit-only devices to achieve a desired level of position accuracy.

Additional Features and Concepts

Figure 10:
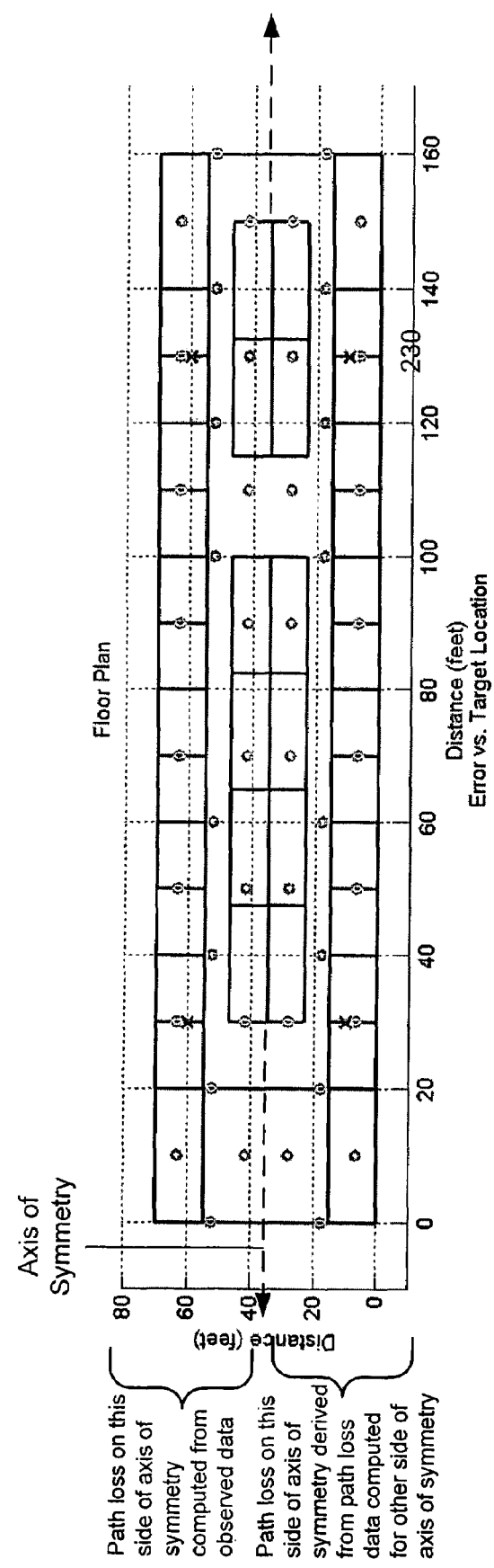
FIG. 10 is a diagram illustrating deployment of sensors on a floor plan that exhibits symmetry.

FIG. 10 illustrates how symmetry with respect to sensors deployed in an area can be exploited to simplify derivation of the path loss data. As shown there is an axis in the area with respect to possible sensor positions shown by the small circles, and planned sensor positions shown by the "x's". The symmetry can be exploited. Path loss data may be computed, as described above in connection with FIGS. 2-6 or FIG. 9, on one side of the axis of symmetry and then from that data, the path loss data for the other side of the axis of symmetry is derived. As a result of recognizing the benefits of the symmetry, sensors may need to be deployed only on one side of the axis of symmetry, thereby saving cost of the system deployment without sacrificing capability or accuracy.

Figure 11:
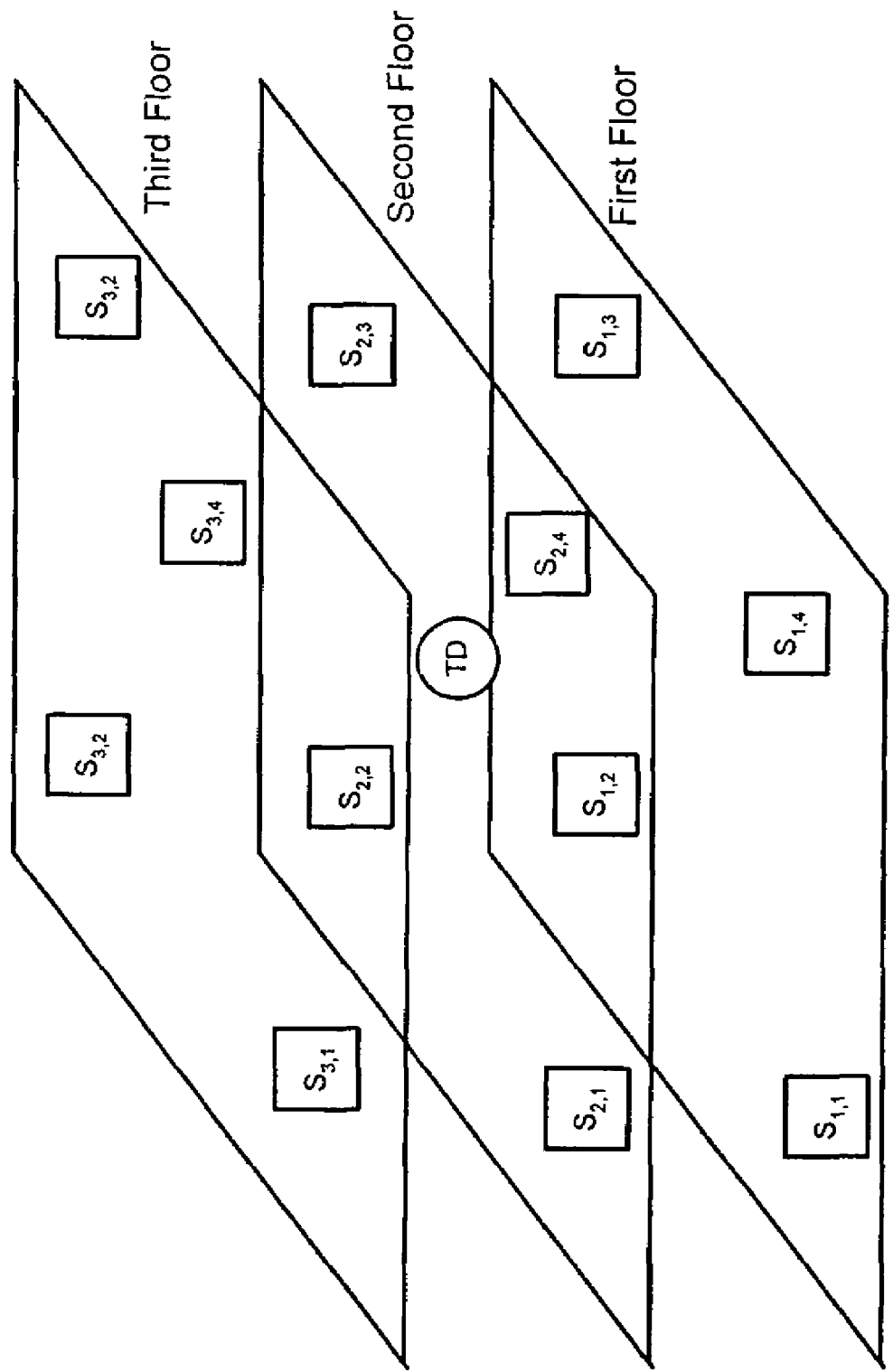
FIG. 11 is a diagram depicting configurations for location devices in a multi-story building.

With reference to FIG. 11, multiple sensors may be deployed on each floor of a multi-story (e.g., 3-story) building. For example, sensors $S_{1,1}$, $S_{1,2}$, $S_{1,3}$, and $S_{1,4}$ are on the first floor, sensors $S_{2,1}$, $S_{2,2}$, $S_{2,3}$, and $S_{2,4}$ are on the second floor and sensors $S_{3,1}$, $S_{3,2}$, $S_{3,3}$, and $S_{3,4}$ are on the third floor. One multi-story approach is called an average power per sensor per floor (APSF) approach. Let P(f,k) be the power received (in mW, not dB) from the target device (TD) at the kth sensor on floor f. The server computes $P_{avg}(f)=\Sigma_k P(f,k)/N(f)$, the average power (or receive signal strength) per sensor per floor, where N(f) is the number of sensors on floor f. The server predicts that the TD is on floor $f_0$, where $f_0$ maximizes $P_{avg}(f)$ over f.

Another multi-story location approach is to put sensors on multiple floors and use these sensors to locate the target device in three dimensions where the sensor locations are tracked in 3-dimensions (instead of 2-dimensions) and 3-dimensional data is used (in the processes shown in FIGS. 2-8). The benefits of this approach relative to the APSF approach is that it depends less on building layout and sensor calibration.

A hybrid approach may be provided that combines these two approaches, where sensors from a certain number of floors (e.g., 3) having the highest Pavg(f) are used to triangulate on the target in three-dimensions using the processes shown in FIGS. 2-8.

FIG. 12 illustrates an example of a block diagram for the sensors 200-230 shown in FIG. 1. The sensor comprises one or more antennas 702 and 704 (two are shown for an example) connected to an RF front-end 710 which in turn is connected to an RF integrated circuit (RFIC) 720. The RFIC 720 performs the downconverting associated with received signals and upconverting associated with signals to be transmitted. The RFIC 720 may operate in more than one band, such as in the 2.4 GHz and the 5 GHz unlicensed bands. A baseband IC (BBIC) 730 is connected to the RFIC 720 and performs the baseband signal processing associated with sensor functions. The BBIC 730 comprises an 802.11 media access control (MAC)/physical layer (PHY) or modem 732 block that performs the necessary baseband modulation and demodulation and MAC control functions associated with, for example, one or more of the IEEE 802.11 WLAN communication standards. An analog-to-digital converter (ADC) 734 and a digital-to-analog converter (DAC) 736 connect between the block 732 and the RFIC 720. A microprocessor control unit (MCU) 750 connects to (or is integrated in) the BBIC 730 and connects to the MAC/PHY block 732. A real-time spectrum analysis engine (SAGE) block 740 may also be provided as part of (or separate from) the BBIC and is interfaced with the RFIC 720 via the ADC 738.

The SAGE block 740 includes a spectrum analyzer 742, a signal detector 743 consisting of a peak detector 744 and one or more pulse detectors 745, a pulse detector lite block 746, and a snapshot buffer 748. A Fast Fourier Transform (FFT) block (not shown) is coupled to the spectrum analyzer 742, or included in the spectrum analyzer 2132. The SAGE 740 generates spectrum activity information that is used in the sensor and the server to determine (classify/identify) the types of signals occurring in the frequency band, and captures signals for location measurement operations. The functions of the SAGE 740 are described more fully in commonly assigned U.S. Pat. No. 6,714,605, commonly assigned co-pending U.S. application Ser. No. 10/420,511, filed Apr. 22, 2003, entitled "System and Method for Real-Time Spectrum Analysis in a Radio Device," and commonly assigned co-pending U.S. Provisional Patent Application No. 60/587,834, filed Jul. 14, 2004, entitled "Pulse Detection Scheme for Use in Real-Time Spectrum Analysis."

The snapshot buffer 748 collects a set of raw digital signal samples useful for signal classification and deriving RSS data from received packets. The snapshot buffer 748 can be triggered to begin sample collection from either the signal detector 748 or from an external trigger source, such as a signal from the processor to capture received signal data for a period of time sufficient to include a series of signal exchanges used for location estimation. Alternatively, the snapshot buffer may be in a free-running state continuously storing captured and then in response to detecting the first signal (e.g., the Probe Request frame), the snapshot buffer is put into a post-store mode that extends long enough to capture the ACK frame signal data. Furthermore, the snapshot buffer 748 can capture raw (digital) data for a received signal from any type of target device, even a device that may interfere with a particular type of communication network, such as an 802.11 WLAN. Among other functions, The MCU 750 can then perform processing on the captured raw data to compute a RSS measurement data therefrom. Moreover, using the snapshot buffer 748 data to compute the RSS data achieves greater accuracy and range than is possible with an 802.11 chipset device, for example.

The advantage of the sensor configuration shown in FIG. 12 is that it may be manufactured into a relatively small form factor, such as an outlet plug-in unit, as shown in FIG. 13, and connection made back to the server via a wireless 802.11 WLAN link as described above. Thus, installing and deploying sensors of this type is simple.

Figure 14:
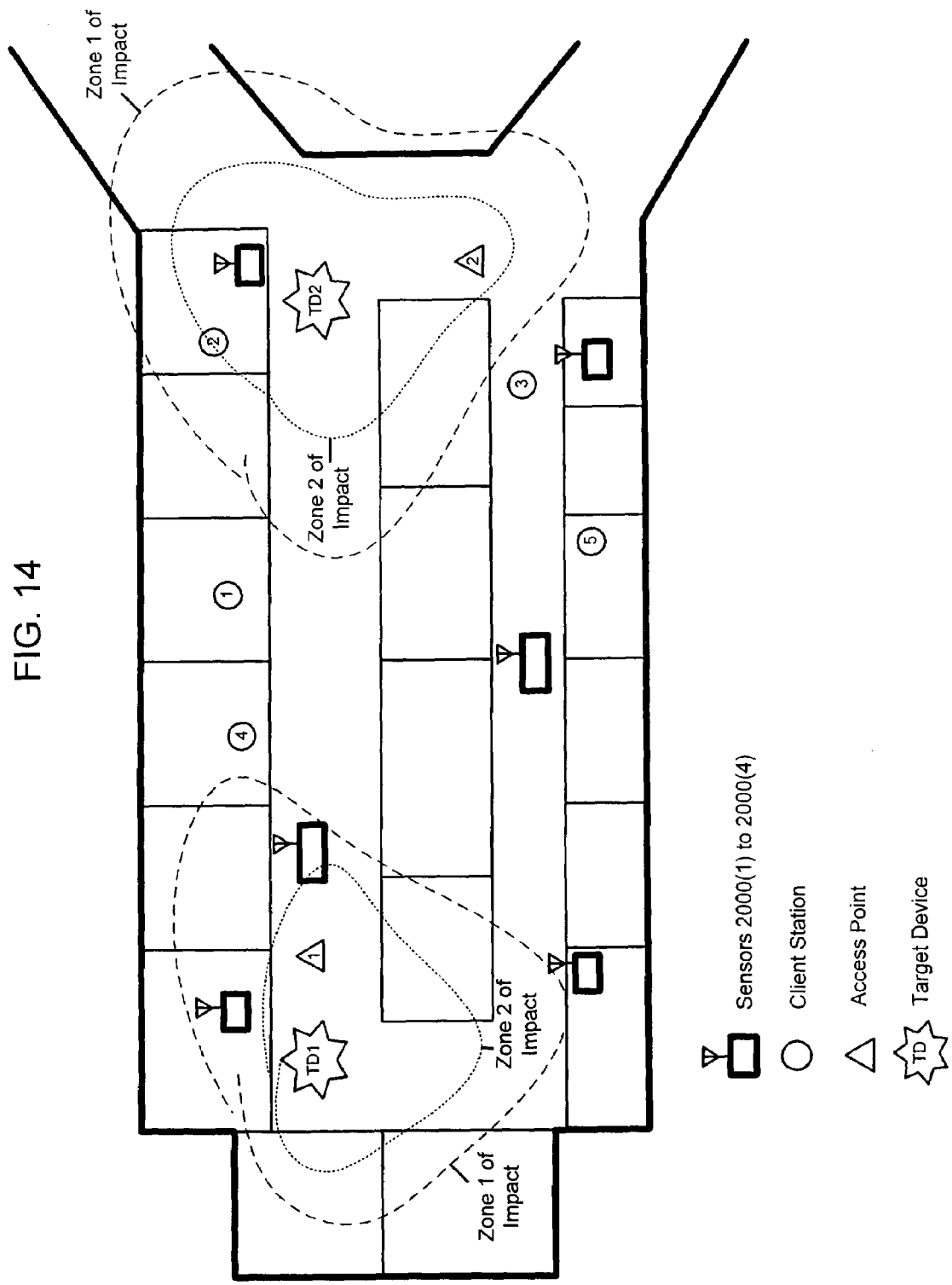
FIG. 14 illustrates a map of a region where wireless activity is occurring and a position of target device is tracked.
Figure 15:
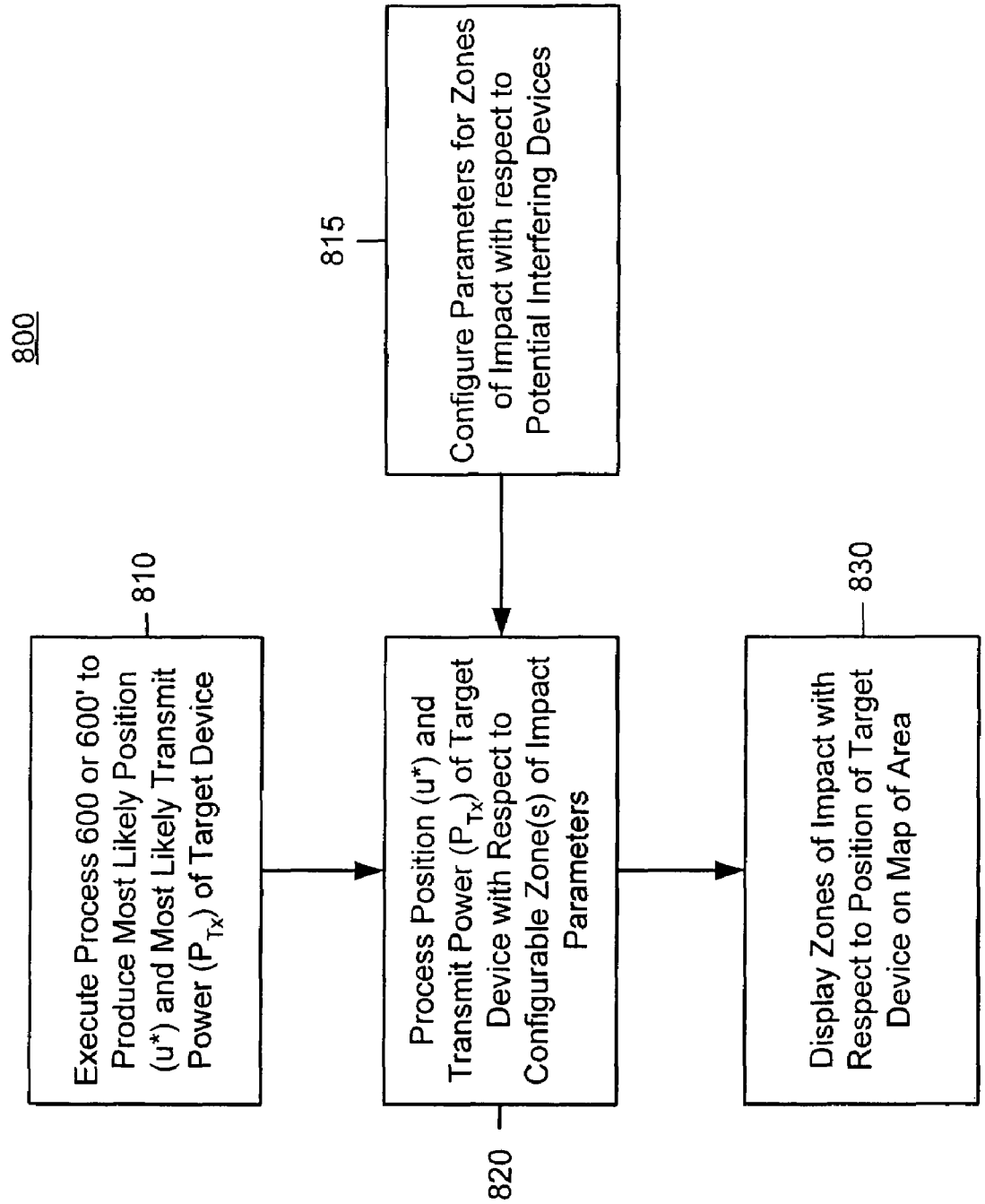
FIG. 15 is a flow chart for a technique to process an estimated position and transmit power of a target device to display one or more zones of impact of the target device with respect to other wireless devices operating in the region.

FIGS. 14 and 15 illustrate one application for the target device position and transmit power estimates using the techniques described above. Once a position and a transmit power of a target device is known, a zone of impact of the target device can be described and displayed with respect to other wireless activity using a variety of configurable zone of impact parameters. Some wireless applications may be adversely affected if the data rate with respect to a WLAN AP drops below a certain threshold. The power level of an interfering target device signal may effectively reduce the carrier-to-interference ratio (C/I), reducing the level of the carrier signal at a WLAN client device. This in turn will reduce the data rate at which the WLAN AP can transmit data to a WLAN client device. The attenuation in receive signal strength with respect to a particular WLAN AP in a zone caused by a particular target device is computed based on the position and transmit power of the target device. This attenuation is then compared with a variety of configurable zone of impact parameters to indicate whether a certain level of service (e.g., data rate) can be served in that zone, and consequently whether a certain wireless application (e.g., synchronous content such as video) requiring a minimal data can be delivered in that zone. As shown in FIG. 14, there may be multiple zones of impact each defined with its own set of parameters. For example, 2 zones of impact are shown with respect to each of the two interfering target devices TD1 and TD2.

Examples of zone of impact parameters for an area:
1. C/I floor threshold for an AP caused by a TD
2. Data rate floor threshold reduction for an AP caused by a TD
3. Power level maximum threshold of a TD The thresholds for one or more of these parameters would be user configurable. When a parameter is activated and a threshold is set for it, the server or other computer performs the necessary computations related to that parameter once a TD's position is determined. For example, if a data rate threshold for a zone has been configured to display when an AP's data rate to a particular area is below 11 Mbps, using the TD's position and transmit power, the server computer computes regions around the TD where the C/I degradation caused by the TD will necessarily reduce the data rate below 11 Mbps. This may be shown as zone 1 with respect to TD1 in FIG. 14, whereas the data rate threshold for zone 1 is set higher, e.g., 54 Mbps. Zone 2 with respect to TD1 may be an area where high data rate applications, such as a video cannot be served by the AP. Similar circumstances may hold for zones 1 and 2 with respect to TD2.

FIG. 15 illustrates a process 800 whereby a zone of impact is displayed in connection with an interfering target device. In step 810, the location estimation process 600 or 600' is executed to produce a most likely position us and a most likely transmit power ($P_{Tx}$). Next, in step 820, the position and transmit power of the target device is compared with respect to configurable zones of impact parameters. These parameters are user defined (e.g., by an IT manager) in step 815. Then, in step 830, zones of impact are displayed on a map with respect to the position of the target device.

Figure 16:
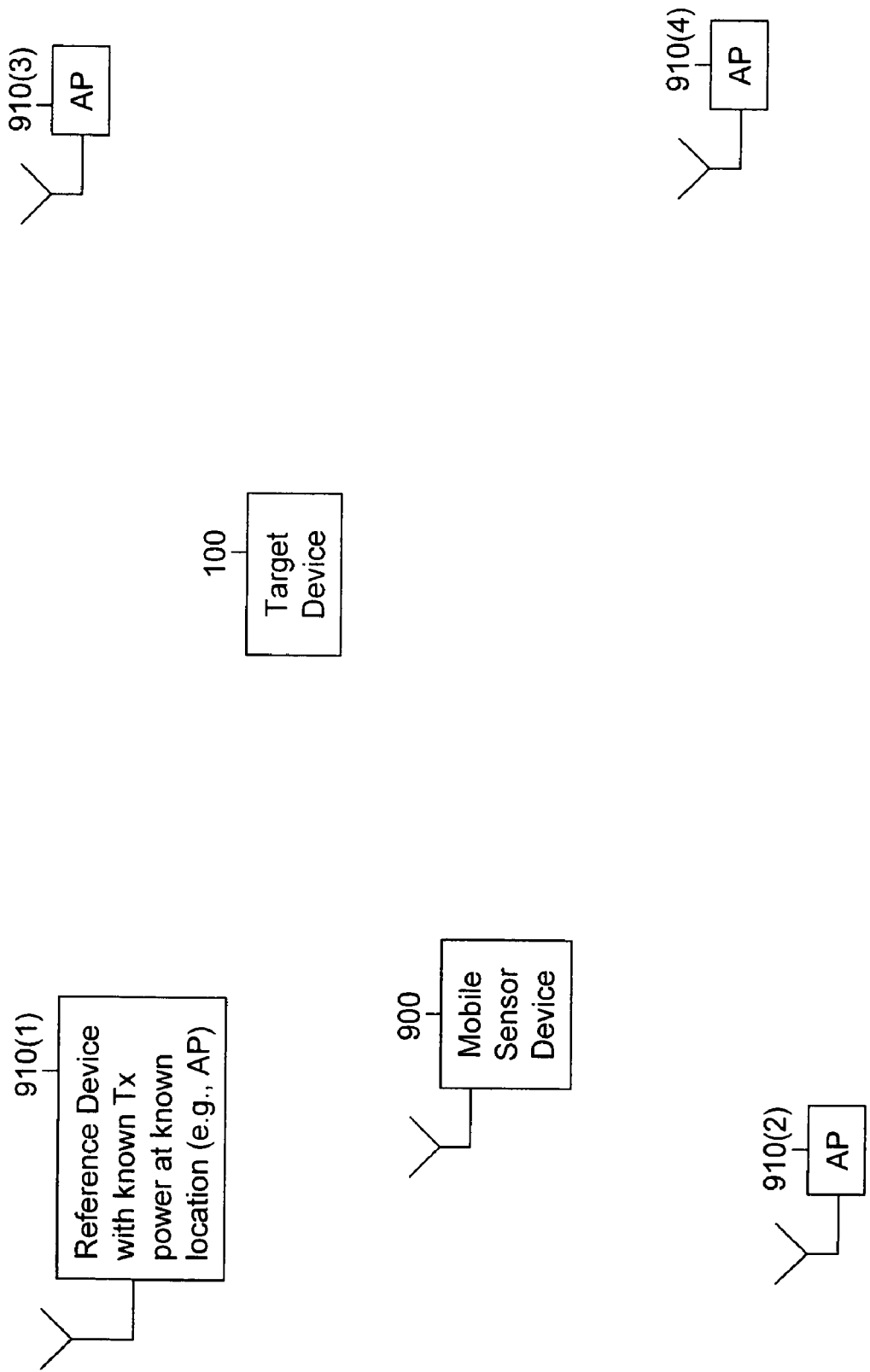
FIG. 16 is a diagram illustrating another embodiment where a mobile sensor device is used to make all of the measurements necessary for the path loss computation and position/transmit power estimation.
Figure 17:
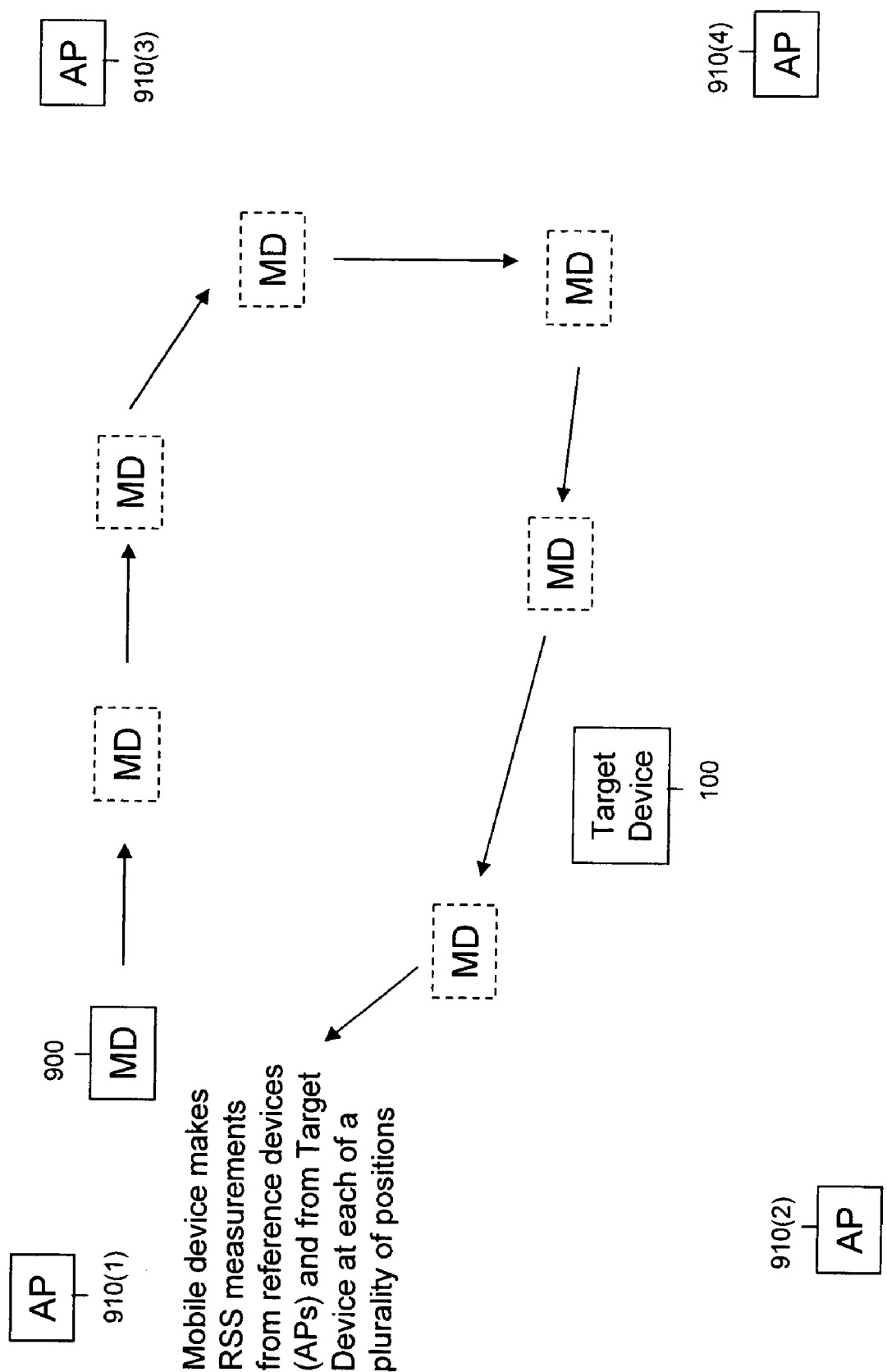
FIG. 17 is a diagram depicting operation of the mobile sensor device positioning technique.
Figure 18:
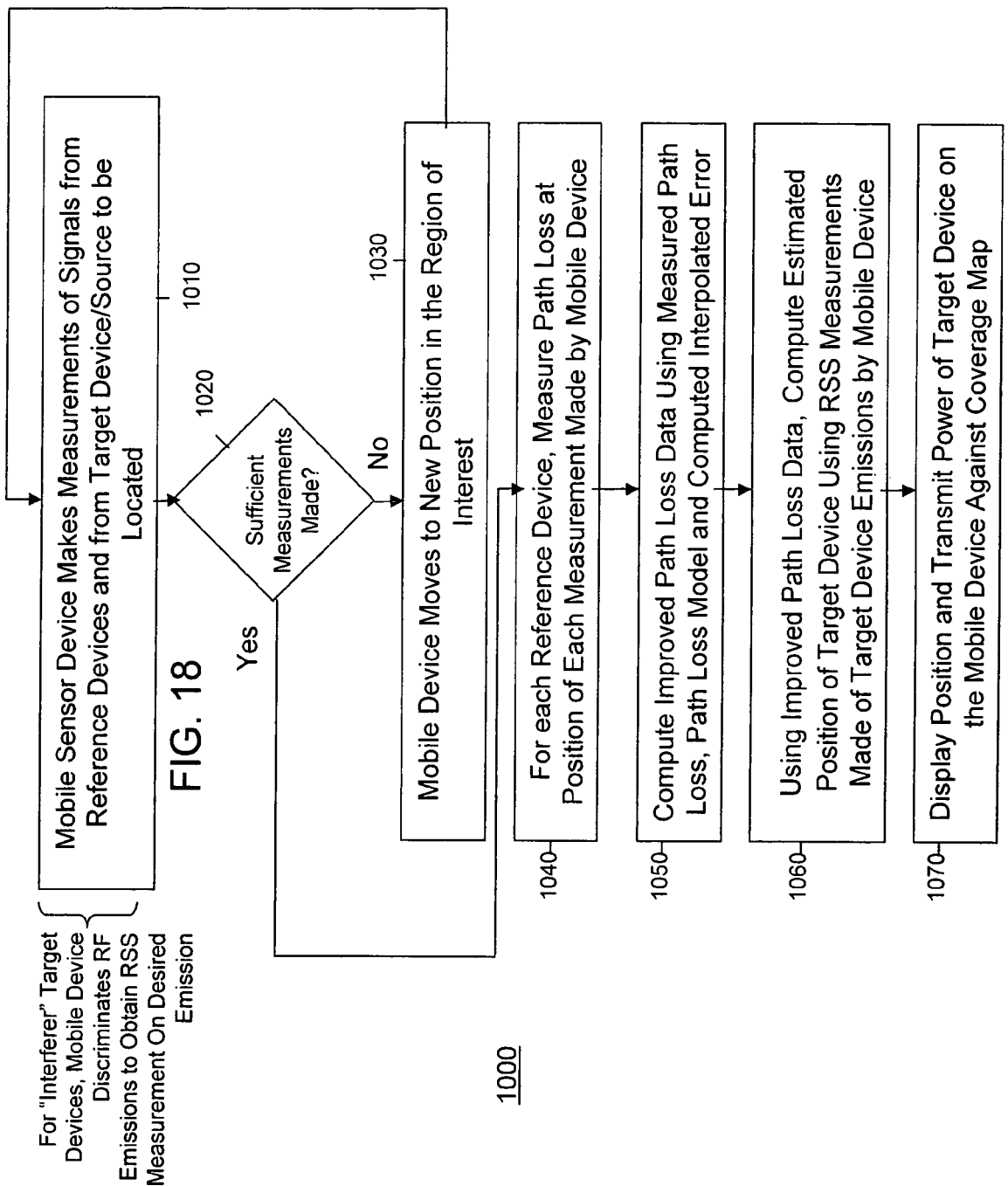
FIG. 18 is a flow chart showing the steps associated with the mobile sensor device positioning technique shown in FIGS. 16 and 17.

Turning to FIGS. 16-18, another embodiment will be described in which the device that makes the RSS measurements and computes the position of the target device is a mobile device, such as a laptop computer, PDA, desktop PC on a wheeled cart, or other mobile computing device. For simplicity, this device is referred to hereinafter as a "mobile sensor device" or "mobile device" (MD) 900. There are a plurality of reference devices 910(1)-910(4) at known positions that transmit reference signals at known transmit powers. For example, these reference devices are WLAN APs, as shown in FIG. 16. The number of reference devices may vary and the four shown in FIG. 16 is only by way of example. The mobile sensor device 900 acts as a moving sensor device that makes measurements of the received reference signals transmitted by each AP and of received emissions that it detects from a target device whose position is to be determined. Each time a user initiates a measurement with the mobile device 900 with respect to a displayed coverage map on the mobile sensor device 900 (left or right click of a mouse), its position is known where each measurement is made. This is described hereinafter in conjunction with FIG. 20.

Referring now to FIG. 18 in conjunction with FIG. 17, a path loss data computation and position and transmit power estimation processes 1000 is shown, where the techniques described above in conjunction with FIGS. 1-15 are applied to a mobile sensor device 900. Rather than a central server computer collecting the RSS measurements and making the position/transmit power estimation of the target device, the mobile sensor device 900 makes the RSS measurements, path loss computations and position/transmit power estimations, after sufficient amount of RSS measurements are obtained. Since the position of the mobile device is known each time it makes measurements at a different position and the positions of the APs are known, the mobile device can compute the actual path loss at each measurement position and use the foregoing techniques to compute the improved path loss, and then ultimately use that information to estimate the position and transmit power of the signal source. With regard to the equations set forth above, the term $u_{sens(i)}$ the position (i) of mobile sensor device 900, where (i) is the position index of the mobile sensor device, which varies depending on where it makes measurements. The term Lmeas($u_{sens(i)}$, $u_{sens(j)}$) in the equations above is the measured path loss between the mobile device at position (i) when receiving a reference or test signal from reference device (j), where (j) is the index for the reference devices 910(1) to 910(4).

As shown in FIG. 18, in steps 1010, 1020 and 1030 the mobile sensor device makes measurements of signals received from the APs and from the target device whose position is to be located, until a sufficient number of measurements have been made. The mobile sensor moves 900 to a new position and makes more measurements of the reference signals from the APs and of the emissions received from the target device. When the mobile sensor device makes measurements of RF energy not associated with the reference signals, it performs a discrimination process to be sure it obtains RSS measurements associated with the target device of interest, as opposed to other signal sources that might be similar to the target device emissions, such as signals that may interfere with the operation of WLAN. Examples of techniques useful for this so called "interferer discrimination" process are described in co-pending commonly assigned U.S. Provisional Application entitled "Discriminating Between Radio Frequency Interferer Signals Detected in a Frequency Band," filed on May 27, 2004, Application No. 60/684,975, the entirety of which is incorporated herein by reference. On the other hand, if the target device to be located is a WLAN device, then the mobile sensor device may be able to distinguish the target device from other WLAN device emissions by examining the MAC address from the received and demodulated transmission.

The mobile sensor device user may be prompted to move to a new position in the region of interest in order to make numerous measurements of the reference signals received from each AP and of the emissions received from the target device. To make a measurement, the mobile sensor device user may, for example, click a mouse or pointer device at a position on a coverage map to indicate an approximate position mobile sensor device where the measurements are made. The user interface software translates the click position on the coverage map of the region of interest to an approximate position of the mobile sensor device. Each time the mobile sensor device measures the signal strength of a reference signal from a reference device (e.g., AP), it has sufficient information to compute a measured path loss at that position with respect to the position of the reference device from which the reference signal is received as shown in step 1040. The measured path loss can be computed at each mobile sensor device position with respect to the position of each of the reference devices. After a sufficient number of measurements are made, the mobile sensor device can measure the path loss at each measurement position with respect to signals received from each reference device since the mobile sensor device will have knowledge of the transmit power (and positions) of the reference devices. Alternatively, if a coverage map is not available or used (and thus the actual position of the mobile device not known when measurements are made), then it is sufficient to know the aspect ratio (length/width) of the region of interest in which the measurements are to be made.

Then, in step 1050 the mobile sensor device computes the improved path loss data using the measured path loss (computed in the prior step for each reference device), a path loss model evaluated at distances corresponding to the distance between the measurement positions of the mobile sensor device and each of the reference devices, and an interpolated path loss error computed as described above.

Next, in step 1060 the mobile sensor device computes an estimated position and transmit power of the target device using the RSS measurements made of the target device emissions at each of the mobile sensor device measurement positions and the improved path loss data. The calculations for this computation are described above in conjunction with FIGS. 5-9. Finally, in step 1070 the position of the target device may be displayed superimposed on a coverage map on a display of the mobile sensor device.

Figure 19:
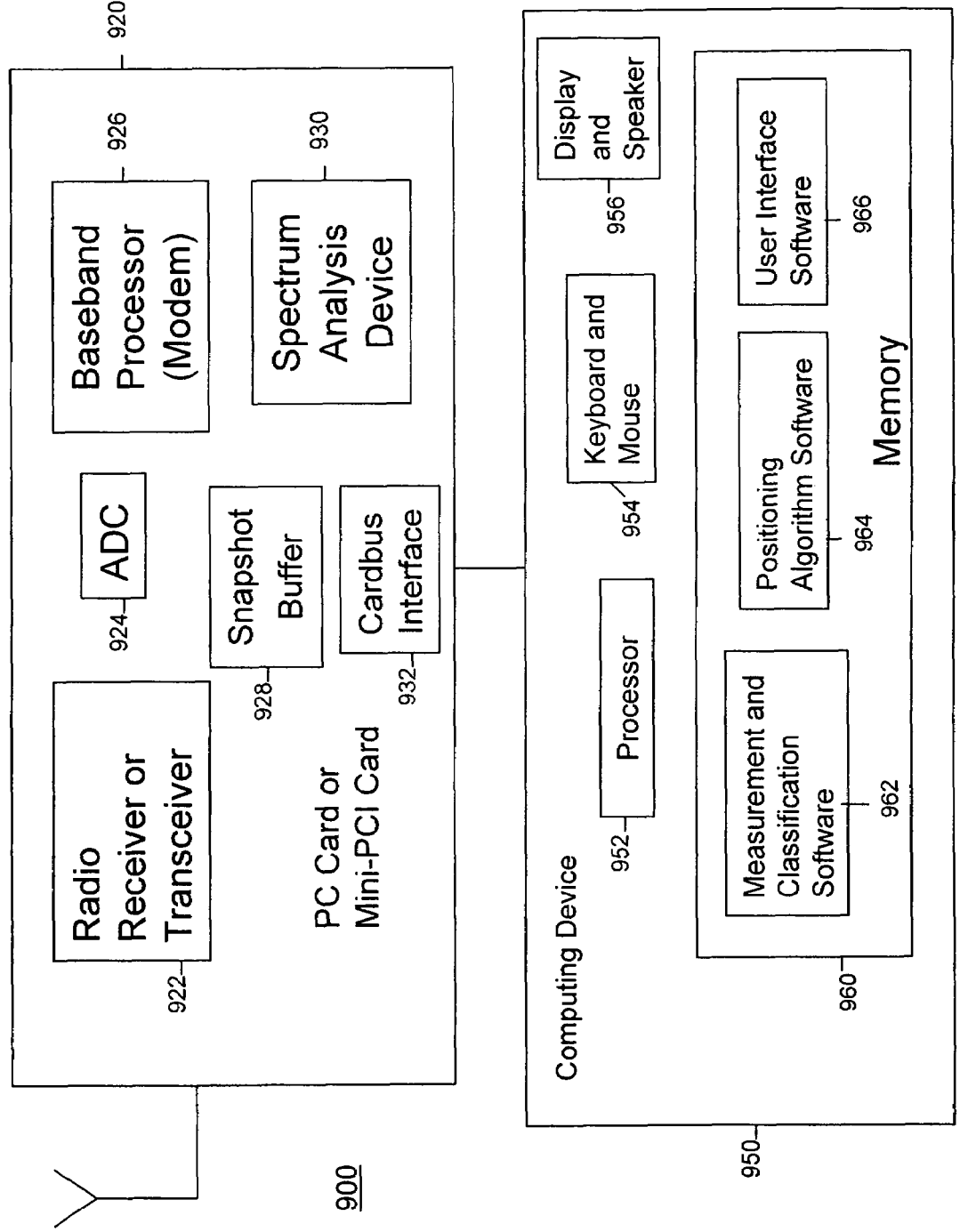
FIG. 19 is an exemplary block diagram of a mobile sensor device.

FIG. 19 illustrates an exemplary block diagram of a mobile sensor device 900. There is an RF processing section 920 and a data processing section 950. These sections may be integrated as part of a computing device, such as a PC, PDA, etc., or the RF processing section may be embodied as a PC or mini-PCI card and the data processing section is a PC device that interfaces (via a Cardbus™ interface 932) to the RF processing section. The RF processing section comprises a radio receiver (or transceiver) 922, analog to digital converter (ADC) 924, baseband processor (e.g., modem) 926, a snapshot buffer 928 for storing digital samples of received downconverted RF energy (not demodulated) and a spectrum analysis device 930. An example of a spectrum analysis device is disclosed in commonly assigned U.S. Pat. No. 6,714,605 B2 and in the following commonly assigned and co-pending U.S. Applications:

| Title | Filing Date | Application No. |
| --- | --- | --- |
| System and Method for Real-Time Spectrum Analysis in a Radio Device | Apr. 22, 2003 | 10/420,511 |
| Pulse Detection Scheme for Use in Real-Time Spectrum Analysis | Aug. 2, 2004 | 10/909,450 |

The data processing section 950 comprises a processor (e.g., a Pentium™ class processor) 952, a display and speaker unit for displaying information to a user 954, a keyboard and mouse 956 and memory 960 that stores RF measurement and classification (and discrimination) software 962, positioning algorithm software 964 (for the RSS-based positioning algorithms described herein) and user interface (UI) software 966 for guiding the user through the positioning procedures described herein and displaying the position of the interferer device with respect to a map drawing of the region of interest.

Figure 20:
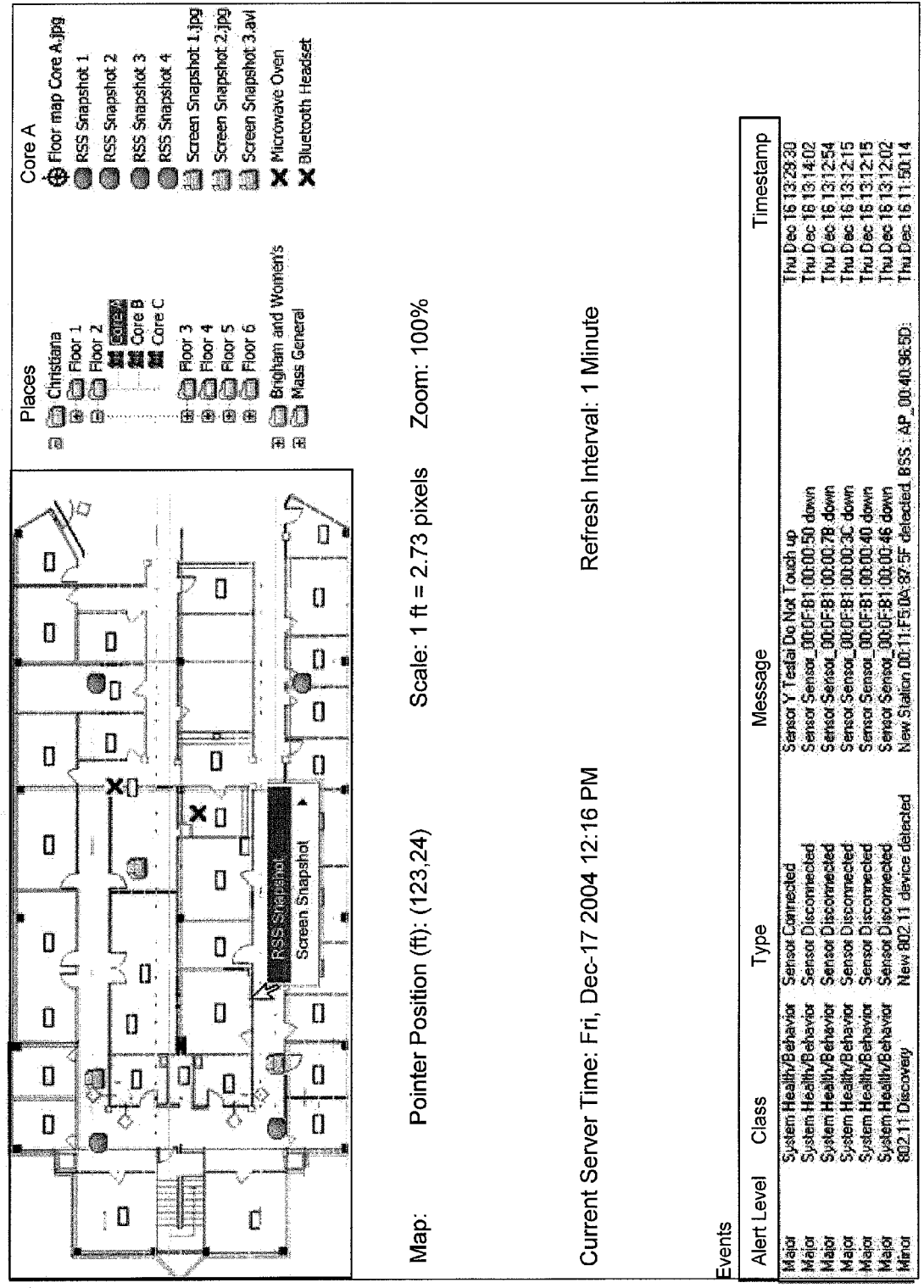
FIG. 20 shows an exemplary display screen/window illustrating how a mobile device makes measurements at various positions, as well as other screen capturing techniques.

With reference to FIG. 20, the UI allows the user to right-click on a position in a floor map, and select "RSS Snapshot . . . " to take an RSS snapshot at that location associated with a received RF energy from a signal source (interferer or non-interferer source). This feature is useful in the positioning techniques described above. Each time an RSS snapshot is taken, the signal strength information for all active devices is recorded on disk, and an RSS Snapshot icon is shown both at the user-selected position on the floor map and in the Place contents pane of the explorer panel. A unique name is also associated with the icons in the explorer panel.

A thermometer pop-up may appear during RSS Snapshots showing measurement completion percentage during the measurement. A phrase may appear in the thermometer window to indicate the current processing step, e.g., "Waiting for DECT1-HS Instance #2 RSS to settle . . . ".

As an example, if the self-calibration positioning algorithm is employed, when a sufficient number of RSS Snapshots are available to locate one or more active devices, the algorithm is employed to estimate the position of each device. Device icons are then displayed—both on the map at the estimated positions, and in the Place contents pane of the explorer panel. Each time the user performs another RSS Snapshot, the algorithm is re-run to compute improved position estimates.

When the user selects an RSS Snapshot icon in the explorer panel, the associated icon on the floor map is highlighted. The converse is also true, i.e., when the user selects an RSS Snapshot icon on the floor map, the associated icon on the explorer panel is highlighted.

When the user double clicks on a Device icon (either on the map viewing area or in the Place contents pane), a pop-up appears showing the following information:
  Name and type of device
  Number of RSS measurements used to estimate position
  Estimated (X,Y) position (if available)
  Estimated Tx power in dBm (if available)
  MAC and IP address (optional, only we have time for 802.11 devices)
  Center frequency, bandwidth, 802.11 channels affected When the user hovers the mouse over a Device icon (either on the map viewing area or in the Place contents pane), the following information may appear in a tool-tip window:
  Name and type of device
  Estimated Tx power in dBm (if available)
  MAC and IP address (optional, only we have time for 802.11 devices)

Device icons may be shown on the floor map viewing area when there are a sufficient number of RSS measurements to estimate their position using SCALE (the minimum number of measurements is usually 4).

When the user selects a Device icon in the explorer panel, the associated icon on the floor map is highlighted (provided enough RSS information is available to form a position estimate for that device). Also, when the user selects a Device icon on the floor map, the associated icon on the explorer panel is highlighted The UI may provide additional options for displaying position information:
  Show/do not show interference zone of impact (based on estimated transmit power from and user-specified receiver sensitivity)
  Show only currently active devices vs. current and previously active devices
  Show selected device only vs. show all devices. In the selected device only mode, a contour map showing the (X,Y) positions for which there is a location estimator confidence of at least X %, where X=90% by default.

The user may change the position of an RSS Snapshot icon on the floor map by dragging it while holding down the left mouse key.

When the user hovers the mouse over an RSS Snapshot icon, the following information will appear in a tool-tip window:
  Date and time of capture
  Number of active devices for which RSS data was stored at time of capture When the user double-clicks on an RSS Snapshot icon (in either the map viewing area or the explorer panel), a pop-up window will appear showing the following information:
  Date and time of capture
  Device type, instance number, and RSS readings from each active device at time of capture When the user selects an RSS Snapshot icon (in either the map viewing area or the explorer panel) and hits the delete key (or selects delete from an appropriate pull-down menu), the icon is removed from both the map viewing area and the explorer panel, the RSS snapshot data is removed from disk, and the positioning algorithm is re-run to remove the effect of the snapshot data from the location estimates.

The UI may display different icons for RSS Snapshot files, Screen Snapshot files, 802.11 APs, 802.11 STAs, and non-802.11 devices (interferer devices). STAs and APs may1 be color coded to indicate whether or not they are Rogue devices. A different device icon type or color may be used to represent currently active vs. inactive devices.

To summarize, a method is provided for determining an impact of a target device based on data pertaining to strength of an emission received from the target device, the method comprising: receiving an emission from the target device at each of a plurality of positions to produce receive signal strength data; computing an estimated position and an estimated transmit power of the target device over a plurality of candidate positions and a plurality of candidate transmit powers of the target device based on the receive signal strength data; and determining a zone of impact of the target device with respect to other wireless activity based on the estimated position and estimated transmit power of the target device.

Also provided is a method for estimating a position of a target device based on data pertaining to strength of an emission received from the target device, the method comprising: receiving at a mobile device an emission from the target device when the mobile device is at each of a plurality of positions and producing receive signal strength data representative thereof; receiving at the mobile device a signal from each of a plurality of reference devices at a corresponding position when the mobile device is at each of said plurality of positions and producing receive signal strength data representative thereof; and estimating a position of the target device based on receive signal strength data associated with receive emissions from the target device and received signal strength data associated with received signals from the reference devices.

In addition, a radio device is provided comprising: a radio receiver that receives radio frequency energy; an analog-to-digital converter that converts the radio frequency energy to digital signals representative thereof; and a processor coupled to the analog-to-digital converter, wherein the processor: generates receive signal strength data representing strength of signals received from a target device to be located when the radio device is at each of a plurality of positions; generates receive signal strength data representing strength of signals received from each of a plurality of reference devices at a corresponding known position when the radio device is at each of said plurality of positions; and estimates a position of the target device based on the receive signal strength data associated with received emissions from the target device and receive signal strength data associated with received signals from the reference devices.

Similarly, a radio device is provided comprising: a radio receiver that receives radio frequency energy; an analog-to-digital converter that converts the radio frequency energy to digital signals representative thereof; a processor coupled to the analog-to-digital converter, wherein the processor: produces receive signal strength data from an emission received from the target device at each of a plurality of known positions to produce receive signal strength data; computes an estimated position and an estimated transmit power of the target device over a plurality of candidate positions and a plurality of candidate transmit powers of the target device based on the receive signal strength data; and determines a zone of impact of the target device with respect to other wireless activity based on the estimated position and estimated transmit power of the target device.

All of the path loss estimation, position and transmit power estimation and zone of impact computation techniques described herein may be embodied by a computer readable medium storing instructions that, when executed by a computer or processor, cause the computer or processor to perform the various path loss estimation and position estimation computation (and other) techniques described herein.

The system and methods described herein may be embodied in other specific forms without departing from the spirit or characteristics thereof. The foregoing embodiments are therefore to be considered in all respects illustrative and not meant to be limiting.

What is claimed is:

1. A method for determining an impact of a target device based on data pertaining to strength of an emission received from the target device, the method comprising:
    a. receiving an emission from the target device at each of a plurality of positions to produce receive signal strength data;
    b. computing an estimated position and an estimated transmit power of the target device over a plurality of candidate positions and a plurality of candidate transmit powers of the target device based on the receive signal strength data;
    c. storing a threshold for each of one or more parameters that are associated with a level of wireless service to be served by at least one access point device in each of one or more corresponding zones; and
    d. determining an impact of the target device based on the estimated position and estimated transmit power of the target device with respect to the threshold for the one or more parameters associated with a level of service in each of the one or more corresponding zones to determine whether the level of wireless service can be served in the one or more corresponding zones.

2. The method of claim 1, and further comprising displaying information depicting a zone of impact of the target device with based on its estimated position and estimated transmit power.

3. The method of claim 1, wherein computing comprises computing the estimated position by minimizing over a plurality of path loss models.

4. The method of claim 1, wherein computing comprises processing received signal strength data obtained at each of the plurality of positions with respect to estimated path loss data with respect to each position.

5. The method of claim 1, and further comprising displaying information depicting impact of the target device in each of the one or more zones with respect to a map.

6. The method of claim 1, and further comprising receiving user input data for the one or more parameters for each of the one or more zones.

7. The method of claim 1, wherein storing comprises storing one or more of: a transmit data rate floor threshold for a transmit data rate used by an access point device in a corresponding zone; a carrier-to-interference ratio floor threshold for an access point device in a corresponding zone; and a transmit power threshold associated with the estimated transmit power of the target device.

8. The method of claim 7, wherein determining comprises determining whether a carrier-to-interference ratio associated with an access point device is below the carrier-tointerference ratio threshold for a corresponding zone as a result of the estimated position and estimated transmit power of the target device.

9. The method of claim 8, and further comprising displaying on a map an indication of the zone in which the carrier-to-interference ratio is less than the carrier-to-interference ratio threshold as a result of the estimated position and estimated transmit power of the target device.

10. The method of claim 9, and further comprising displaying on a map an indication of the zone in which the transmit data rate for the access point device has been reduced to be less than the transmit data rate threshold as a result of the estimated position and estimated transmit power of the target device.

11. The method of claim 10, wherein displaying comprises displaying on the map an indication of a zone in which one or more wireless applications or services are not available as a result of the reduced transmit data rate of a access point.

12. The method of claim 8, wherein determining comprises determining whether a transmit data rate used by an access point device is less than the transmit data rate threshold in a corresponding zone as a result of the estimated position and estimated transmit power of the target device.

13. The method of claim 1, and further comprising generating path loss estimate data with respect to each of the plurality of positions which are known positions, by:
  i. with respect to a test signal transmitted by from each known position, measuring path loss at each of the other known positions to measure the path loss between combinations of pairs of known positions;
  ii. evaluating a path loss model based on the distance between combinations of pairs of known positions to produce path loss model data;
  iii. computing, relative to each known position, a path loss error between the measured path loss and the path loss model data when the path loss is measured at each of the other known positions relative to that known position;
  iv. interpolating a path loss error relative to each known position at a candidate position from the corresponding computed path loss errors; and
  v. computing a path loss estimate between a candidate position and each known position by adding the interpolated path loss error relative to a known position at the candidate position to path loss data obtained by evaluating the path loss model based on a distance between a known position and the candidate position.

14. The method of claim 13, wherein interpolating comprises interpolating the path loss error relative to each known position at each of a plurality of candidate positions, and computing the path loss estimate comprises computing a path loss estimate between each of the plurality of candidate positions and each known position by adding the interpolated path loss error relative to a known position at each candidate position to path loss data obtained by evaluating the path loss model based on a distance between the known position and the corresponding candidate position.

15. The method of claim 13, wherein interpolating the path loss error comprises interpolating the path loss error relative to each known position at each candidate position using a multi-dimensional interpolation technique.

16. The method of claim 1, and further comprising generating estimated path loss data with respect to each of the plurality of positions, which are known positions, by:
  a. with respect to a test signal transmitted from each known position, measuring path loss at each of the other known positions to measure the path loss between all combinations of pairs of known positions;
  b. for each known position, deriving parameters for a path loss model function from the measured path loss between that known position and each of the other known positions; and
  c. computing a path loss estimate between a candidate position and each known position by evaluating the path loss model function using the parameters derived for each known position.

17. The method of claim 16, wherein deriving comprises minimizing a mean squared error between the measured path loss between a known position and each of the other known positions and the path loss model function between that known position and each of the other known positions.

18. The method of claim 17, wherein deriving comprises computing a minimum of a square of a norm of a difference between a vector representing measured path loss between a known position and each of the other known positions and a vector representing the path loss model function based on corresponding distances between the known position and each of the other known positions.

19. The method of claim 1, wherein receiving comprises receiving one or more emissions from the target device at each of a plurality of antennas at each of the plurality of positions.

20. The method of claim 1, wherein computing comprises computing a position u*, where $$u_* = \arg\min_{u} \min_{P_{Tx}} \|r - \hat{r}(u, P_{Tx})\|^2,$$

where u is one of the plurality of candidate positions, $P_{Tx}$ is one of a plurality of candidate transmit powers of the target device, r is a vector representing receive signal strength observations at the plurality of positions, and $$\hat{r}(u, P_{Tx}) \triangleq 10\log_{10}[10^{0.1(P_{Tx} \cdot 1 - [\hat{L}(u, u_{sens(1)}), \ldots, \hat{L}(u, u_{sens(N)})]^T)} + 10^{0.1 \cdot NF}],$$

where $$\hat{L}(u, u_{sens(j)}) \triangleq Lmodel(u, u_{sens(j)}) + Interp(u, u_{sens(1)}, \cdots, u_{sens(N)}, e_j)$$

is a path loss estimate at candidate position u with respect to position (j), $u_{sens(j)}$, and $Lmodel(u, u_{sens(j)})$ is path loss model data between candidate position u and position $u_{sens(j)}$, $e_j$ is the path loss error between the measured path loss and the path loss model data $Lmodel(u, u_{sens(j)})$, and $Interp(\ )$ is an interpolation function representing interpolation of the path loss error relative to each position $u_{sens(j)}$ at a candidate position from the path loss errors.

21. The method of claim 20, wherein computing comprising applying an iterative multi-dimensional minimization algorithm to the equation $$\arg\min_{u} \min_{P_{Tx}} \|r - \hat{r}(u, P_{Tx})\|^2 \text{ over } u.$$

22. The method of claim 20, wherein computing comprises estimating the position of the target device based on a sequence $r_1, \ldots, r_{Nseq}$ of receive signal strength observations from multiple transmissions by the target device, by computing the position $$u_* = \arg\min_u \min_{P_{Tx}} \sum_{n=1}^{Nseq} \|r_n - \hat{r}(u, P_{Tx})\|^2,$$

for the Nseq of observations $r_1, \ldots, r_{Nseq}$.

23. The method of claim 20, wherein computing comprises estimating the position of the target device based on a sequence $r_n$ of receive signal strength observations from multiple transmissions by the target device, by solving for $$u_* = \arg\min_u \min_{P_{Tx}} LPF_n(\|r_n - \hat{r}(u, P_{Tx})\|^2),$$

where LPF represents a low pass filter, one for each candidate position/transmit power pair $(U, P_{Tx})$, and wherein a most likely position estimate is the candidate position that corresponds to the low pass filter having the smallest output.

24. The method of claim 20, wherein computing a position estimate u* of the target device comprises computing $$u_* = \arg\min_u \min_{P_{Tx}} LPF_n[\|r1_n - \hat{r}(u, P_{Tx})\|^2 + \cdots + \|rP_n - \hat{r}(u, P_{Tx})\|^2],$$

where LPF represents a low pass filter, one for each candidate position/transmit power pair $(u, P_{Tx})$, and wherein a most likely position estimate is the candidate position that corresponds to the low pass filter having the smallest output.

25. The method of claim 24, wherein computing position estimate u* of the target device comprises computing a first position estimate using a first low pass filter and a second position estimate using a second low pass filter, wherein the first low pass filter has a slower response than the second low pass filter and further comprising selecting the first position estimate as the position estimate u* of the target device unless a difference between the first position estimate and the second position estimate is greater than a threshold, otherwise selecting the second position estimate as the position estimate u* of the target device.

26. The method of claim 20, wherein computing a position estimate u* of the target device comprises computing $$u_* = \arg\min_u \min_{model} \min_{P_{Tx}} LPF_n(\|r1_n - \hat{r}(u, P_{Tx})\|^2 + \cdots + \|rP_n - \hat{r}(u, P_{Tx})\|^2),$$

where a first path loss model is associated with relatively low obstruction densities and a second path loss model is associated with relatively high obstruction densities.

27. The method of claim 1, wherein computing comprises computing a position estimate of the target device by, for each candidate position and for a range of candidate transmit powers $P_{Tx}$ of the target device:
  a. computing $\hat{r}=10 \log_{10} [10^{0.1(P_{Tx}\cdot 1 - L1)} + 10^{0.1\cdot NF}]$, where $L1=[\hat{L}(u, u_{sens(1)}), \ldots, \hat{L}(u, u_{sens(N)})]^T$ is a matrix composed of path loss estimates $\hat{L}(u, u_{sens(1)})$ to $\hat{L}(u, u_{sens(N)})$ at candidate position u with respect to a corresponding position which is a known position and NF is the noise floor at each corresponding known position;

b. computing a function $$J(u, P_{Tx}) = \sum_{n=1}^{Nseq} [\|r1_n - \hat{r}\|^2 + \cdots + \|rP_n - \hat{r}\|^2]$$

for each candidate position u and candidate transmit power $P_{Tx}$, where $\{r1n\}, \ldots, \{rPn\}$, n=1, ..., Nseq, are receive signal strength observations on P antennas of each of the plurality of known positions; and
  c. selecting the candidate position that minimizes the function $J(u, P_{Tx})$ over all candidate positions and transmit powers.

28. The method of claim 27, wherein selecting comprises selecting the candidate position in the candidate position/transmit power pair that minimizes the function $J(u, P_{Tx})$.

29. The method of claim 28, and further comprising generating one or more candidate transmit powers based on prior estimated positions of the target device.

30. The method of claim 28, wherein generating comprises generating one or more candidate transmit powers by storing candidate transmit powers for prior estimated positions of the target device, computing a median candidate transmit power from the stored candidate transmit powers for prior estimated positions, and providing a set of candidate transmit powers based on the median.

31. The method of claim 28, wherein generating comprises generating a set of candidate transmit powers by providing a plurality of transmit powers that progressively deviate from the median by a desired amount.

32. The method of claim 1, wherein computing comprises computing a position estimate of the target device by, for each candidate position and for a range of candidate transmit powers $P_{Tx}$ of the target device:
  a. computing $\hat{r}=10 \log_{10} [10^{0.1(P_{Tx}\cdot 1 - L1)} + 10^{0.1\cdot NF}]$, where $L1=[\hat{L}(u, u_{sens(1)}), \ldots, \hat{L}(u, u_{sens(N)})]^T$ is a matrix composed of path loss estimates $\hat{L}(u, u_{sens(1)})$ to $\hat{L}(u, u_{sens(N)})$ at candidate position u with respect to a corresponding position which is known position and NF is the noise floor at the corresponding known position;
  b. computing a function $$J(u, P_{Tx}) = \sum_{n=1}^{Nseq} [\|r1_n - \hat{r}\|^2 + \cdots + \|rP_n - \hat{r}\|^2]$$

for each candidate position u and candidate transmit power $P_{Tx}$, where $\{r1n\}, \ldots, \{rPn\}$, n=1, ..., Nseq, are receive signal strength observations on P antennas of each of the plurality of known positions;
  c. selecting a set of candidate position/candidate transmit power pairs that are the N minimum of the function $J(u, P_{Tx})$; and
  d. selecting the candidate position/transmit power pair in the set of candidate position/candidate transmit power pairs that minimizes an absolute value of the difference between the candidate transmit power and a median of candidate transmit powers for the target device at prior estimated positions, wherein the candidate position in the selected candidate position/candidate transmit power pair is the position estimate of the target device.

33. The method of claim 32, and further comprising storing candidate transmit powers for prior estimated positions of the target device and computing the median candidate transmit power from the stored candidate transmit powers for prior estimated positions of the target device.

34. The method of claim 1, wherein receiving, computing and determining are performed in a mobile device that moves to each of the plurality of positions when receiving emissions from the target device.

35. A method for estimating a position of a target device based on data pertaining to strength of an emission received from the target device, the method comprising:
   a. receiving at a mobile device an emission from the target device when the mobile device is at each of a plurality of positions and producing receive signal strength data representative thereof;
   b. receiving at the mobile device a signal from each of a plurality of reference devices at a corresponding position when the mobile device is at each of said plurality of positions and producing receive signal strength data representative thereof; and
   c. estimating a position of the target device based on receive signal strength data associated with receive emissions from the target device and received signal strength data associated with received signals from the reference devices, wherein estimating comprises computing a most likely position over a plurality of path loss models, a plurality of candidate positions and a plurality of candidate transmit powers based on the received signal strength data, and computing the most likely position by minimizing over the plurality of path loss models.

36. The method of claim 35, and further comprising determining a zone of impact of the target device with respect to other wireless activity based on the estimated position and estimated transmit power of the target device.

37. The method of claim 36, and further comprising displaying information depicting the zone of impact of the target device based on its estimated position and estimated transmit power.

38. The method of claim 35, wherein estimating comprises generating path loss estimate data with respect to each measurement position where the mobile device makes measurements from signals received from the reference devices by:
   a. measuring path loss at each mobile device measurement position with respect to the positions of each of the reference devices;
   b. evaluating a path loss model based on the distance between all combinations of pairs of mobile device measurement positions and reference device positions to produce path loss model data;
   c. computing, relative to each mobile device measurement position, a path loss error between the measured path loss and the path loss model data;
   d. interpolating a path loss error relative to each mobile device measurement position at a candidate position from the corresponding computed path loss errors; and
   e. computing a path loss estimate between a candidate position and each mobile device measurement position by adding the interpolated path loss error relative to a mobile device measurement position at the candidate position to path loss data obtained by evaluating the path loss model based on a distance between a mobile device measurement position and the candidate position.

39. The method of claim 35, wherein estimating comprises computing a position u*, where $$u_* = \arg\min_{u} \min_{P_{Tx}} \|r - \hat{r}(u, P_{Tx})\|^2,$$

where u is one of the plurality of candidate positions, $P_{Tx}$ is one of a plurality of candidate transmit powers of the target device, r is a vector representing receive signal strength observations at the mobile device measurement positions, and $$\hat{r}(u, P_{Tx}) \triangleq 10\log_{10}[10^{0.1(P_{Tx} \cdot 1 - [\hat{L}(u, u_{sens(1)}), \ldots, \hat{L}(u, u_{sens(N)})]^T)} + 10^{0.1 \cdot NF}],$$

where $$\hat{L}(u, u_{sens(j)}) \triangleq Lmodel(u, u_{sens(j)}) + Interp(u, u_{sens(1)}, \ldots, u_{sens(N)}, e_j)$$

is a path loss estimate at candidate position u with respect to mobile device measurement position (j), $u_{sens(j)}$, and Lmodel (u, $u_{sens(j)}$) is path loss model data between candidate position u and mobile device position $u_{sens(j)}$, $e_j$ is the path loss error between the measured path loss and the path loss model data Lmodel(u, $u_{sens(j)}$), and Interp( ) is an interpolation function representing interpolation of the path loss error relative to each mobile device measurement position at a candidate position from the path loss errors.

40. The method of claim 35, wherein computing comprises processing received signal strength data obtained at each of the plurality of mobile device measurement positions with respect to estimated path loss data with respect to each mobile device measurement positions position.

41. The method of claim 35, wherein computing comprises computing a position u*, where $$u_* = \arg\min_{u} \min_{P_{Tx}} \|r - \hat{r}(u, P_{Tx})\|^2,$$

where u is one of the plurality of candidate positions, $P_{Tx}$ is one of a plurality of candidate transmit powers of the target device, r is a vector representing receive signal strength observations at the mobile device measurement positions, and $$\hat{r}(u, P_{Tx}) \triangleq 10\log_{10}[10^{0.1(P_{Tx} \cdot 1 - [\hat{L}(u, u_{sens(1)}), \ldots, \hat{L}(u, u_{sens(N)})]^T)} + 10^{0.1 \cdot NF}],$$

where $$\hat{L}(u, u_{sens(j)}) \triangleq Lmodel(u, u_{sens(j)}) + Interp(u, u_{sens(1)}, \ldots, u_{sens(N)}, e_j)$$

is a path loss estimate at candidate position u with respect to a mobile device measurement position (j), $u_{sens(j)}$, and Lmodel(u, $u_{sens(j)}$) is path loss model data between candidate position u and a mobile device measurement position $u_{sens(j)}$, $e_j$ is the path loss error between the measured path loss and the path loss model data Lmodel(u, $u_{sens(j)}$), and Interp( ) is an interpolation function representing interpolation of the path loss error relative to mobile device measurement position $u_{sens(j)}$ at a candidate position from the path loss errors.

42. The method of claim 41, wherein computing comprising applying an iterative multi-dimensional minimization algorithm to the equation $$\arg\min_{u} \min_{P_{Tx}} \|r - \hat{r}(u, P_{Tx})\|^2 \text{ over } u.$$

43. The method of claim 41, wherein computing comprises estimating the position of the target device based on a sequence $r_1, \ldots, r_{Nseq}$ of receive signal strength observations from multiple transmissions by the target device, by computing the position $$u_* = \arg\min_{u} \min_{P_{Tx}} \sum_{n=1}^{N_{seq}} \|r_n - \hat{r}(u, P_{Tx})\|^2,$$

for the Nseq of observations $r_1, \ldots, r_{Nseq}$.

44. The method of claim 41, wherein computing comprises estimating the position of the target device based on a sequence $r_n$ of receive signal strength observations from multiple transmissions by the target device, by solving for $$u_* = \arg\min_{u} \min_{P_{Tx}} LPF_n\big(\|r_n - \hat{r}(u, P_{Tx})\|^2\big),$$

where LPF represents a low pass filter, one for each candidate position/transmit power pair $(u, P_{Tx})$, and wherein a most likely position estimate is the candidate position that corresponds to the low pass filter having the smallest output.

45. The method of claim 41, wherein computing a position estimate u* of the target device comprises computing $$u_* = \arg\min_{u} \min_{P_{Tx}} LPF_n\lfloor\|r1_n - \hat{r}(u, P_{Tx})\|^2 + \cdots + \|rP_n - \hat{r}(u, P_{Tx})\|^2\rfloor,$$

where LPF represents a low pass filter, one for each candidate position/transmit power pair $(u, P_{Tx})$, and wherein a most likely position estimate is the candidate position that corresponds to the low pass filter having the smallest output.

46. The method of claim 45, wherein computing position estimate u* of the target device comprises computing a first position estimate using a first low pass filter and a second position estimate using a second low pass filter, wherein the first low pass filter has a slower response than the second low pass filter and further comprising selecting the first position estimate as the position estimate u* of the target device unless a difference between the first position estimate and the second position estimate is greater than a threshold, otherwise selecting the second position estimate as the position estimate u* of the target device.

47. The method of claim 41, wherein computing a position estimate u* of the target device comprises computing $$u_* = \arg\min_{u} \min_{model} \min_{P_{Tx}} LPF_n\big(\|r1_n - \hat{r}(u, P_{Tx})\|^2 + \cdots + \|rP_n - \hat{r}(u, P_{Tx})\|^2\big),$$

where a first path loss model is associated with relatively low obstruction densities and a second path loss model is associated with relatively high obstruction densities.

48. The method of claim 35, wherein computing comprises computing a position estimate of the target device by, for each candidate position and for a range of candidate transmit powers $P_{Tx}$ of the target device:

a. computing $\hat{r}=10 \log_{10} [10^{0.1 \cdot (P_{Tx} \cdot 1 - L1)} + 10^{0.1 \cdot NF}]$, where $L1=[\hat{L}(u, u_{sens(1)}), \ldots, \hat{L}(u, u_{sens(N)})]^T$ is a matrix composed of path loss estimates $\hat{L}(u, u_{sens(1)})$ to $\hat{L}(u, u_{sens(N)})$ at candidate position u with respect to a mobile device measurement position and NF is the noise floor at each mobile device measurement position;

b. computing a function $$J(u, P_{Tx}) = \sum_{n=1}^{Nseq} [\|r1_n - \hat{r}\|^2 + \ldots + \|rP_n - \hat{r}\|^2]$$

for each candidate position u and candidate transmit power $P_{Tx}$, where $\{r1n\}, \ldots, \{rPn\}$, $n=1, \ldots, Nseq$, are receive signal strength observations on P antennas of the mobile device at each mobile device measurement position; and c. selecting the candidate position that minimizes the function $J(u, P_{Tx})$ over all candidate positions and transmit powers.

49. The method of claim 48, wherein selecting comprises selecting the candidate position in the candidate position/transmit power pair that minimizes the function $J(u, P_{Tx})$.

50. The method of claim 49, and further comprising generating one or more candidate transmit powers based on prior estimated positions of the target device.

51. The method of claim 50, wherein generating comprises generating one or more candidate transmit powers by storing candidate transmit powers for prior estimated positions of the target device, computing a median candidate transmit power from the stored candidate transmit powers for prior estimated positions, and providing a set of candidate transmit powers based on the median.

52. The method of claim 51, wherein generating comprises generating a set of candidate transmit powers by providing a plurality of transmit powers that progressively deviate from the median by a desired amount.

53. A method for estimating a position of a target device based on data pertaining to strength of an emission received from the target device, the method comprising:

a. recieving at a mobile device an emission from the target device when the mobile device is at each of a plurality of positions and producing receive signal strength data representative thereof;

b. receiving at the mobile device a signal from each of a plurality of reference devices at a corresponding position when the mobile device is at each of said plurality of positions and producing receive signal strength data representative thereof; and c. estimating a position of the target device based on receive signal strength data associated with receive emissions from the target device and received signal strength data associated with received signals from the reference devices, wherein estimating comprises generating path loss estimate data with respect to each measurement position where the mobile device makes measurements from signals received from the reference devices by:

i. measuring path loss at each mobile device measurement position with respect to the positions of each of the reference devices;

ii. evaluating a path loss model based on the distance between all combinations of pairs of mobile device measurement positions and reference device positions to produce path loss model data;
iii. computing, relative to each mobile device measurement position, a path loss error between the measured path loss and the path loss model data;
iv. interpolating a path loss error relative to each mobile device measurement position at a candidate position from the corresponding computed path loss errors, wherein interpolating the path loss error comprises interpolating the path loss error relative to each mobile device measurement position at each candidate position using a multi-dimensional interpolation technique; and
v. computing a path loss estimate between a candidate position and each mobile device measurement position by adding the interpolated path loss error to a mobile device measurement position at the candidate position to path loss data obtained by evaluating the path loss model based on a distance between a mobile device measurement position and the candidate position.

54. A radio device comprising:
a. a radio receiver that receives radio frequency energy;
b. an analog-to-digital converter that converts the radio frequency energy to digital signals representative thereof;
c. a processor coupled to the analog-to-digital converter, wherein the processor:
  i. generates receive signal strength data representing strength of signals received from a target device to be located when the radio device is at each of a plurality of positions;
  ii. generates receive signal strength data representing strength of signals received from each of a plurality of reference devices at a corresponding known position when the radio device is at each of said plurality of positions; and
  iii. estimates a position of the target device based on the receive signal strength data associated with received emissions from the target device and receive signal strength data associated with received signals from the reference devices by computing a most likely position over a plurality of path loss models, a plurality of candidate positions and a plurality of candidate transmit powers based on the received signal strength data, and computing the most likely position by minimizing over the plurality of path loss models.

55. The radio device of claim 54, wherein the processor estimates the position of the target device by generating path loss estimate data with respect to each measurement position where the device receives a reference signal from a reference device, by:
i. measuring path loss at each measurement position with respect to the positions of each of the reference devices, wherein each measurement position is a known position;
ii. evaluating a path loss model based on the distance between combinations of pairs of known measurement positions of the device and reference device positions to produce path loss model data;
iii. computing, relative to each measurement position, a path loss error between the measured path loss and the path loss model data;
iv. interpolating a path loss error relative to each measurement position at a candidate position from the corresponding computed path loss errors; and
v. computing a path loss estimate between a candidate position and each measurement position by adding the interpolated path loss error relative to a measurement position at the candidate position to path loss data obtained by evaluating the path loss model based on a distance between a measurement position and the candidate position.

56. The radio device of claim 55, wherein the processor interpolates the path loss error by interpolating the path loss error relative to each measurement position at each of a plurality of candidate positions, and the processor computes the path loss estimate by computing a path loss estimate between each of the plurality of candidate positions and each measurement position by adding the interpolated path loss error relative to a measurement position at each candidate position to path loss data obtained by evaluating the path loss model based on a distance between the mobile device positions and the corresponding candidate position.

57. The radio device of claim 55, wherein the processor estimates the position of the target device by computing a position u*, where $$u_* = \underset{u}{\arg\min}\underset{P_{Tx}}{\min}\|r - \hat{r}(u, P_{Tx})\|^2,$$

where u is one of the plurality of candidate positions, $P_{Tx}$ is one of a plurality of candidate transmit powers of the target device, r is a vector representing receive signal strength observations at the plurality of measurement positions, and $$\hat{r}(u, P_{Tx}) \triangleq 10\log_{10}\left[10^{0.1\left(P_{Tx}\cdot 1 - [\hat{L}(u,u_{sens(1)}),\ldots,\hat{L}(u,u_{sens(N)})]^T\right)} + 10^{0.1\cdot NF}\right],$$

where $$\hat{L}(u, u_{sens(j)}) \triangleq Lmodel(u, u_{sens(j)}) + Interp(u, u_{sens(1)},\ldots,u_{sens(N)}, e_j)$$

is a path loss estimate at candidate position u with respect to measurement position (j), $u_{sens(j)}$, and $Lmodel(u, u_{sens(j)})$ is path loss model data between candidate position u and measurement position $u_{sens(j)}$, $e_j$ is the path loss error between the measured path loss and the path loss model data $Lmodel(u, u_{sens(j)})$, and Interp( ) is an interpolation function representing interpolation of the path loss error relative to each measurement position $U_{sens(j)}$ at a candidate position from the path loss errors.

58. The radio device of claim 54, wherein the processor further estimates a transmit power of the target device.

59. The radio device of claim 58, wherein the processor determines a zone of impact of the target device with respect to other wireless activity based on the estimated position and estimated transmit power of the target device.

60. The radio device of claim 58, wherein the processor generates display information depicting the zone of impact by the target device based on the estimated position and estimated transmit power.

61. The radio device of claim 58, and further comprising a memory that stores one or more zone of impact parameters for a target device, wherein the processor processes the estimated position and the estimated transmit power of the target device with respect to the one or more zone of impact parameters generates display information depicting one or more zones of impact of the target device with respect to a map.

62. The radio device of claim 61, wherein the memory stores one or more of: (a) a transmit data rate threshold associated with a transmit data used by a wireless network access point device; (b) a carrier-to-interference ratio threshold associated with a wireless network access point device; and transmit power threshold associated with the estimated transmit power of the target device.

63. A radio device comprising:
  a. a radio that receives radio frequency energy;
  b. an analog-to-digital converter that converts the radio frequency energy to digital signals representative thereof;
  c. a professor coupled to the analog-to-digital converter, wherein the processor:
    i. generates signal strength data representing strength of signals received from a target device to be located when the radio device is at each of a plurality of positions;
    ii. generates receive strength data representing strength of signals received from each of a plurality of reference devices at a corresponding known position when the radio device is at each of said plurality of positions; and
    iii. estimates a position of the target device based on the receive signal strength data associated with received emissions from the target device and receive signal strength data associated with received signals from the reference devices, wherein the processor estimates the position of the target device by generating path loss estimate data with respect to each measurement position where the device receives a reference signal from a reference device, by: measuring path loss at each measurement position with respect to the positions of each of the reference devices, wherein each measurement position is a known position; evaluating a path loss model based on the distance between combinations of pairs of known measurement positions of the device and reference device positions to produce path loss model data; computing, relative to each measurement position, a path loss error between the measured path loss and the path loss model data; interpolating a path loss error relative to each measurement position at a candidate position from the corresponding computed path loss errors using a multi-dimensional interpolation technique; and computing a path loss estimate between a candidate position and each measurement position by adding the interpolated path loss error relative to a measurement position at the candidate position to path loss data obtained by evaluating the path loss model based on a distance between a measurement position and the candidate position.

64. A radio device comprising:
  a. a radio receiver that receives radio frequency energy;
  b. an analog-to-digital converter that converts the radio frequency energy to digital signals representative thereof;
  c. a processor coupled to the analog-to-digital converter, wherein the processor:
    i. generates receive signal strength data representing strength of signals received from a target device to be located when the radio device is at each of a plurality of positions;
    ii. generates receive signal strength data representing strength of signals received from each of a plurality of reference devices at a corresponding known position when the radio device is at each of said plurality of positions; and
    iii. estimates a position of the target device based on the receive signal strength data associated with received emissions from the target device and receive signal strength data associated with received signals from the reference devices, wherein the processor estimates the position of the target device using information pertaining to an aspect ratio of the region of interest in which measurements are made.

65. The radio device of claim 64, wherein the processor estimates the position of the target device using the information pertaining to the aspect ratio of the region, and wherein the measurement positions are unknown positions.

66. A radio device comprising:
  a. a radio receiver that receives radio frequency energy;
  b. an analog-to-digital converter that converts the radio frequency energy to digital signals representative thereof;
  c. a memory that stores a threshold for each of one or more parameters that are associated with a level of wireless service to be served by at least one access point device in each of one or more corresponding zones; and
  d. a processor coupled to the analog-to-digital converter, wherein the processor:
    i. produces receive signal strength data from an emission received from the target device at each of a plurality of known positions to produce receive signal strength data
    ii. computes an estimated position and an estimated transmit power of the target device over a plurality of candidate positions and a plurality of candidate transmit powers of the target device based on the receive signal strength data; and
    iii. determines an impact of the target device based on the estimated position and estimated transmit power of the target device with respect to the threshold for the one or more parameters associated with a level of service in each of the one or more corresponding zones to determine whether the level of wireless service can be served in the one or more corresponding zones.

67. The device of claim 66, wherein the processor receives user input data for storing the one or more parameters in the memory.

68. The device of claim 66, wherein the memory stores parameters comprising one or more of: a transit data rate floor threshold for a transmit data rate used by an access point in a corresponding zone; a carrier to interference ratio floor threshold for an access point device in a corresponding zone; and a transit power threshold associated with the estimated transmit power of the target device.

69. The device of claim 68, wherein the processor determines one or more of: whether a carrier-to-interference ratio associated with an access point device is below the carrier-to-interference ratio threshold for a corresponding zone as a result of the estimated position and estimated transmit power of the target device; and whether transmit data rate used by an access point device is less than the transmit data rate threshold in a corresponding zone as a result of the estimated position and estimated transmit power of the target zone.

70. The device of claim 69, wherein the processor generates data for display on a map at least one of: indication of the zone in which the carrier-to-interference ratio is less than the carrier-to-interference ratio threshold as a result of the estimated position and estimated transmit power of the target device; an indication of the zone in which the transmit data rate for the access point device has been reduced to be less than the transmit data rate threshold as a result of the estimated position and estimated transmit power of the target device.

* * * * *